United States Patent [19]
Taki et al.

[11] Patent Number: 6,151,352
[45] Date of Patent: *Nov. 21, 2000

[54] WIRELESS COMMUNICATION USING A FREQUENCY HOPPING METHOD

[75] Inventors: Kazunari Taki, Nagoya; Hiroshi Kuno, Ogaki, both of Japan

[73] Assignee: Brother Kogyo Kabushiki Kaisha, Nagoya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/834,458

[22] Filed: Apr. 16, 1997

[30] Foreign Application Priority Data

| Apr. 16, 1996 | [JP] | Japan | 8-094309 |
| Apr. 16, 1996 | [JP] | Japan | 8-094310 |
| Apr. 16, 1996 | [JP] | Japan | 8-094312 |

[51] Int. Cl.⁷ .................................................. H04L 27/30
[52] U.S. Cl. ............................................................. 375/132
[58] Field of Search ................................... 375/202, 134, 375/132; 455/450, 451, 452, 426

[56] References Cited

U.S. PATENT DOCUMENTS

| 5,633,888 | 5/1997 | Steward | 375/202 |
| 5,758,290 | 5/1998 | Nealon et al. | 375/202 |
| 5,781,536 | 7/1998 | Ahmadi et al. | 375/202 |
| 5,784,368 | 7/1998 | Weigand et al. | 375/202 |
| 5,903,618 | 5/1999 | Miyake et al. | 375/336 |

*Primary Examiner*—Temesghen Ghebretinsae
*Assistant Examiner*—Kevin M. Burd
*Attorney, Agent, or Firm*—Oliff & Berridge, PLC

[57] ABSTRACT

A wireless communication system capable of communicating by a frequency hopping method, includes a base unit that can be connected to an external telephone circuit and multiple handsets that can communicate wirelessly with the base unit. A hopping table of the base unit stores a hop frequency data array B for communications between the base unit and a selected handset. A hopping table of each handset stores hot frequency data arrays H1 and H2 for communications between two handsets in addition to the hop frequency data array B possessed by the based unit. During communications between the base unit and a handset, communications between handsets are possible by using the hop frequency data arrays H1, H2.

31 Claims, 19 Drawing Sheets

BASE UNIT 10

| N | B |
|---|---|
| 0 | b 0 |
| 1 | b 1 |
| 2 | b 2 |
| 3 | b 3 |
| 4 | b 4 |
| 5 | b 5 |
| ⋮ | ⋮ |
| n | b n |
| n + 1 | b n+1 |
| n + 2 | b n+2 |
| ⋮ | ⋮ |

HANDSETS 11~13

| N | B | H 1 | H 2 |
|---|---|---|---|
| 0 | b 0 | b 0 | b 0 |
| 1 | b 1 | b 1 | b 1 |
| 2 | b 2 | b 2 | b 2 |
| 3 | b 3 | b 3 | b 3 |
| 4 | b 4 | h 1 4 | h 2 4 |
| 5 | b 5 | h 1 5 | h 2 5 |
| ⋮ | ⋮ | ⋮ | ⋮ |
| n | b n | h 1 n | h 2 n |
| n + 1 | b n+1 | h 1 n+1 | h 2 n+1 |
| n + 2 | b n+2 | h 1 n+2 | h 2 n+2 |
| ⋮ | ⋮ | ⋮ | ⋮ |

BASE UNIT 10

| N | C | B |
|---|---|---|
| 0 | c 0 | c 0 |
| 1 | c 1 | c 1 |
| 2 | c 2 | c 2 |
| 3 | c 3 | c 3 |
| 4 | c 4 | b 4 |
| 5 | c 5 | b 5 |
| ⋮ | ⋮ | ⋮ |
| n | c n | b n |
| n + 1 | c n+1 | b n+1 |
| n + 2 | c n+2 | b n+2 |
| ⋮ | ⋮ | ⋮ |

FIG. 14 (b)

HANDSETS 11~13

| N | C | B | H 1 | H 2 |
|---|---|---|---|---|
| 0 | c 0 | c 0 | c 0 | c 0 |
| 1 | c 1 | c 1 | c 1 | c 1 |
| 2 | c 2 | c 2 | c 2 | c 2 |
| 3 | c 3 | c 3 | c 3 | c 3 |
| 4 | c 4 | b 4 | h 1 4 | h 2 4 |
| 5 | c 5 | b 5 | h 1 5 | h 2 5 |
| ⋮ | ⋮ | ⋮ | ⋮ | ⋮ |
| n | c n | b n | h 1 n | h 2 n |
| n + 1 | c n+1 | b n+1 | h 1 n+1 | h 2 n+1 |
| n + 2 | c n+2 | b n+2 | h 1 n+2 | h 2 n+2 |
| ⋮ | ⋮ | ⋮ | ⋮ | ⋮ |

FIG. 17

| N | D |
|---|---|
| 0 | d 0 |
| 1 | d 1 |
| 2 | d 2 |
| 3 | d 3 |
| 4 | d 4 |
| 5 | d 5 |
| ⋮ | ⋮ |
| n | d n |
| n + 1 | d n+1 |
| n + 2 | d n+2 |
| ⋮ | ⋮ |

# WIRELESS COMMUNICATION USING A FREQUENCY HOPPING METHOD

BACKGROUND OF THE INVENTION

1. Field of the Invention

The present invention relates to a wireless communication system provided with at least two handsets that connect wirelessly to a base unit. The system uses a wireless communication method that allows direct communications between handsets.

2. Description of the Prior Art

Cordless telephones that perform bi-directional communications between a base unit and handset are well-known in the art. In this type of cordless telephone, a handset receives data transmitted by a base unit at a frequency f1, and the base unit receives data transmitted by the handset at a frequency f2.

However, if two or more handsets are provided with one base unit, and the base unit is receiving signals from one handset at a frequency f2, for example, the base unit cannot receive signals from another handset at the frequency f1. Hence, communication between two handsets is not possible.

Further, cordless telephones that perform spread spectrum communications between a base unit and handset using a frequency hopping method are well-known in the art. In this type of cordless telephone, the frequency switching sequence (hereinafter referred to as "hopping pattern") used during communications is predetermined, and the base unit and handset always follow the same hopping pattern.

However, direct communication between two handsets has not been possible because of the possibility that such direct communication might conflict with control signals being transmitted from the base unit.

SUMMARY OF THE INVENTION

In view of the foregoing, it is an object of the present invention to provide a wireless communication system in which communications between two handsets are possible in addition to communications between the base unit and a plurality of handsets.

Another object of the present invention is to provide a wireless communication system in which the same hopping pattern is used in communications between the two handsets and between the base unit and a selected handset, yet enabling respective communications to be performed simultaneously.

Still another object of the present invention is to provide a wireless communication system in which frequencies used in communications between the two handsets and between the base unit and the selected handset do not interfere with each other.

To achieve the above and other objects, there is provided according to one aspect of the invention a wireless communication method which is applied to a wireless communication system including a main communicating device that can be connected to an external communication path and a plurality of sub communicating devices that can communicate wirelessly with the main communicating device wherein a frequency hopping method is used to perform communications between the main communicating device and a selected sub communicating device. In the invention, the frequency used by the main communicating device is sequentially changed according to a prescribed hopping pattern and the frequency used by the selected sub communicating device is also sequentially changed in synchronism with the frequency used by the main communicating device. A frequency used by a first sub communicating device is sequentially changed according to a hopping pattern different from the prescribed hopping pattern and a frequency used by a second sub communicating device is also changed sequentially in synchronism with the frequency used by the first sub communicating device. By so doing, direct communication can be performed between the first sub communicating device and the second sub communicating device.

According to another aspect of the present invention, there is provided a wireless communication system capable of communicating by a frequency hopping method. The system includes a main communicating device that can be connected to an external communications path, and a plurality of sub communicating devices that can communicate wirelessly with the main communicating device. A hop frequency data generator is provided in each of said main communicating device and said plurality of sub communicating devices. The hop frequency data generator sequentially generates prescribed hop frequency data. A communicating unit is provided in each of said main communicating device and said plurality of sub communicating devices. The communicating unit uses the prescribed hop frequency data supplied from said hop frequency data generator to create transmission signals by frequency spreading input signals and to create output signals by frequency despreading reception signals. The hop frequency data generator provided in each of said plurality of sub communicating devices is capable of generating hop frequency data arrays for communication between two sub communicating devices which data arrays are different from the hop frequency data arrays for communication between the main communicating device and a sub communicating device. Two communicating units in selected two of said plurality of sub communicating devices perform direct communications therebetween by using the hop frequency data for communication between the two sub communicating devices wherein transmission signals are created by frequency spreading input signals output signals are created by frequency despreading reception signals.

A portion of the hop frequency data arrays used for communication between the selected two sub communicating devices has a pattern identical to a portion of the hop frequency data arrays used for communication between the main communicating device and a sub communicating device. The communicating unit performs transmission and reception of control signals between said main communicating device and said plurality of sub communicating devices when the hop frequency data generator generates hop frequency data in the identical portion of the data arrays.

The hop frequency data generator is capable of generating a hop frequency data array for control use that is different from the hop frequency data arrays for communicating both between the main communicating device and the selected sub communicating device and between selected two sub communicating devices. The communicating unit performs transmission and reception of control signals between said main communicating device and the selected sub communicating device when said hop frequency data generator generates the hop frequency data for control use.

The hop frequency data generator in each of said plurality of sub communicating devices generates hop frequency data for recovering synchronicity. The communicating unit in each of said plurality of sub communicating devices waits in a state in which said communicating unit is capable of receiving control signals from said main communicating device when said hop frequency data generator in said sub communicating device generates the hop frequency data for recovering synchronicity.

The hop frequency data generator includes data memory that stores prescribed hop frequency data arrays, and hop frequency data changing means for updating data within a hop frequency data array stored in said data memory.

The wireless communication system may further includes an interference detector that detects interference during communications. The hop frequency data changing means excludes from a data array hop frequency data used when interference is detected by said interference detector.

The hop frequency data generators in said plurality of sub communicating devices are capable of generating a plurality of different hop frequency data arrays for use in communication between two selected sub communicating devices. The communicating units in said plurality of sub communicating devices form a plurality of channels that allow simultaneous communication between a plurality of pairs of sub communicating devices by performing transmission and reception using one of the plurality of hop frequency data arrays for each pair of sub communicating devices.

At least two external communication paths are connected to said main communicating device, and one of the external communication paths is connected to a sub communicating device via said communicating unit.

According to still another aspect of the present invention, there is provided a wireless communication system capable of communicating by a frequency hopping method. The system includes a main communicating device that can be connected to an external communications path, a plurality of sub communicating devices that can communicate wirelessly with the main communicating device, and a hop frequency data generator provided in said main communicating device and each of said plurality of sub communicating devices. The hop frequency data generator sequentially generates prescribed hop frequency data for both the main communicating device and said plurality of sub communicating devices. A communicating unit is also provided in said main communicating device and each of said plurality of sub communicating devices. The communicating unit uses hop frequency data supplied from said hop frequency data generator to create transmission signals by frequency spreading input signals and to create output signals by frequency despreading reception signals. The hop frequency data generator in each of said plurality of sub communicating devices is capable of generating hop frequency data arrays for communication between two selected sub communicating devices by phase-shifting the hop frequency data arrays used for communication between said main communicating device and a selected sub communicating device. The communicating units in said plurality of sub communicating devices perform direct communications between the two selected sub communicating devices by using the hop frequency data for communication between two selected sub communicating devices to create transmission signals by frequency spreading the input signals and to create output signals by frequency despreading the reception signals.

The hop frequency data generator in said plurality of sub communicating devices can temporarily cancel the phase shifting when generating hop frequency data arrays for communication between two selected sub communicating devices. The communicating unit transmits and receives control signals between said main communicating device and said plurality of sub communicating devices while the phase shifting is canceled.

The hop frequency data generator is capable of generating hop frequency data arrays for control use by phase-shifting the hop frequency data array used for communication between said main communicating device and the selected sub communicating device to a different hop frequency data array from that created for communication between two selected sub communicating devices. The communicating unit performs transmission and reception of control signals between said main communicating device and said plurality of sub communicating devices when said hop frequency data generator generates the hop frequency data array for control use.

When two selected sub communicating devices are engaged in communication, adjustments to synchronize the sub communicating devices to said main communicating device are performed at regular intervals by transmission and reception of control signals between said main communicating device and said plurality of sub communicating devices. Adjustments to synchronize said plurality of sub communicating devices to said main communicating device are performed by transmission and reception of control signals between said main communicating device and said plurality of sub communicating devices after communication between two selected sub communicating devices has ended.

The hop frequency data generator in each of said plurality of sub communicating devices is capable of generating hop frequency data for recovering synchronization. The communicating unit in each of said plurality of sub communicating devices waits in a state capable of receiving control signals from said main communicating device when said hop frequency data generator in said plurality of sub communicating devices generates hop frequency data for recovering synchronization.

The hop frequency data generator in each of said plurality of sub communicating devices is capable of generating more than two hop frequency data arrays by way of phase-shifting. The two hop frequency data arrays are used in communication between two selected sub communicating devices. The communicating units in said plurality of sub communicating devices form a plurality of channels that allow simultaneous communication between a plurality of pairs of sub communicating devices by performing transmission and reception using one of the plurality of hop frequency data arrays for each pair of sub communicating devices.

The hop frequency data generator includes data memory that stores prescribed hop frequency data arrays, index value storing means for holding an index value used to perform sequential updates synchronous to another communicating device, and index value correcting means for correcting the index value stored in said index value storing means a prescribed amount to create a corrected index value. The prescribed hop frequency data arrays stored in said data memory are referred to using the corrected index value as a parameter, and hop frequency data arrays are generated by phase-shifting the prescribed hop frequency data arrays according to the modified index value.

The index value modifying means retains the index value stored in said index value storing means as the modified index value when said hop frequency data generator generates a hop frequency data array either for communication between said main communicating device and the selected sub communicating device or for control use. The index value correcting means calculates a modified index value by adding a specified value to the index value stored in said index value storing means when said hop frequency data generator generates another hop frequency data array.

The phases of the phase-shifted hop frequency data arrays are shifted forward or backward by at least two phases from hop frequency data array being used at the same time.

According to still another aspect of the invention, there is provided a wireless communication system capable of communicating by a frequency hopping method. The system includes a main communicating device, a plurality of sub communicating devices, a hop frequency data generator, and a communication unit as described above. The hop frequency data generator in each of said plurality of sub communicating devices is capable of generating hop frequency data arrays for communication between two selected sub communicating devices by increasing or decreasing a prescribed amount each of the data in the hop frequency data arrays used for communication between said main communicating device and a selected sub communicating device. The communicating units in said plurality of sub communicating devices perform direct communications between two selected sub communicating devices by using the hop frequency data for communication between two selected sub communicating devices to create transmission signals by frequency spreading input signals and to create output signals by frequency despreading reception signals.

The hop frequency data generator in each of said plurality of sub communicating devices can temporarily cancel prescribed increases or decreases to the hop frequency data when generating hop frequency data arrays for communication between two selected sub communicating devices. The communicating unit transmits and receives control signals between said main communicating device and said plurality of sub communicating devices while the increase or decrease adjustment is canceled.

The hop frequency data generator is capable of generating hop frequency data arrays for control use by increasing or decreasing each data in the hop frequency data array used for communication between the main communicating device and a sub communicating device to create a different hop frequency data array from that created for communication between two sub communicating devices. The communicating unit performs transmission and reception of control signals between said main communicating device and said plurality of sub communicating devices when said hop frequency data generator generates the hop frequency data array for control use.

When two selected sub communicating devices are engaged in communication, adjustments to synchronize the sub communicating devices to the main communicating device are performed at regular intervals by the transmission and reception of control signals between said main communicating device and said plurality of sub communicating devices. Adjustments to synchronize said sub communicating devices to said main communicating device are performed by the transmission and reception of control signals between the main communicating device and sub communicating devices after communication between two sub communicating devices has ended.

The hop frequency data generating means in the sub communicating devices is capable of generating hop frequency data for recovering synchronization. The communicating unit in each of said sub communicating devices waits in a state capable of receiving control signals from said main communicating device when said hop frequency data generator in said sub communicating devices generates hop frequency data for recovering synchronization.

The hop frequency data generators in said sub communicating devices are capable of generating a plurality of different hop frequency data arrays, increased or decreased by specified values so that each data array is different from the others, for use in communication between two sub communicating devices. The communicating units in said sub communicating devices form a plurality of channels that allow simultaneous communication between a plurality of pairs of sub communicating devices by performing transmission and reception using one of the plurality of hop frequency data arrays for each pair of sub communicating devices.

The hop frequency data generator includes data memory that stores prescribed hop frequency data arrays, index value storing means for holding an index value used to perform sequential updates synchronous to another communicating device, and data modifying means that use the index value stored by the index value storing means as a parameter for referencing data stored by the data memory and adding a prescribed value to the data. The data modifying means is used to generate hop frequency data arrays whose data is increased or decreased by specified values.

The data modifying means retains the data stored by the data memory as modified data when the hop frequency data generating means generates a hop frequency data array either for communication between the main communicating device and the sub communicating device or for control use. The data modifying means calculates modified data by adding a specified value to the data stored by the data storing means when the hop frequency data generator generates another hop frequency data array.

The prescribed amounts by which data within hop frequency data arrays are increased or decreased are smaller than the difference between neighboring hop frequency data within the hop frequency data arrays.

BRIEF DESCRIPTION OF THE DRAWINGS

The above and other objects, features and advantages of the present invention will become more apparent from the following description when taken in conjunction with the accompanying drawings, in which:

FIGS. 4(a) and 4(b) are explanatory diagrams illustrating hop frequency data arrays;

FIG. 13 is a diagram showing the states of communication operations in the base unit and handsets over time:

FIGS. 14(a) and 14(b) are explanatory diagrams illustrating hop frequency data arrays used in a variation of the embodiment;

FIG. 17 is an explanatory diagram illustrating a hop frequency data array for the second embodiment;

DETAILED DESCRIPTION OF THE PREFERRED EMBODIMENTS

A wireless communication system according to a preferred embodiment of the present invention will be described while referring to the accompanying drawings. The wireless communication system described below represents only one example of the embodiment, and the embodiment is in no way limited to this example.

Figure 1:
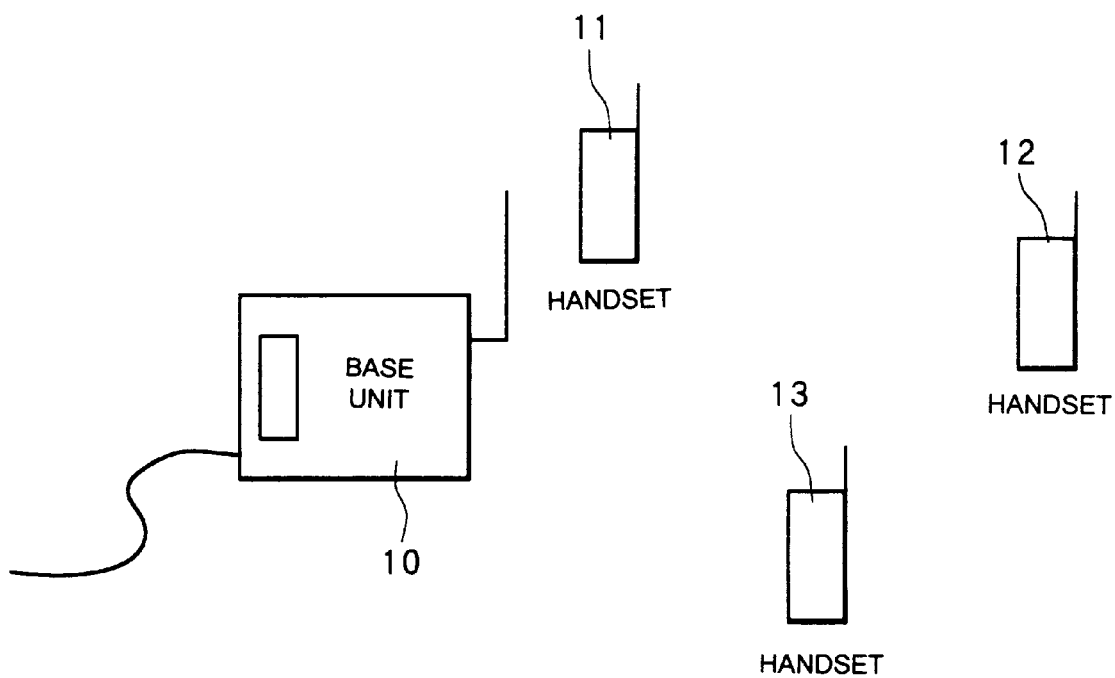
FIG. 1 is an explanatory diagram showing the overall configuration for a wireless communication system of the embodiment.
Figure 2:
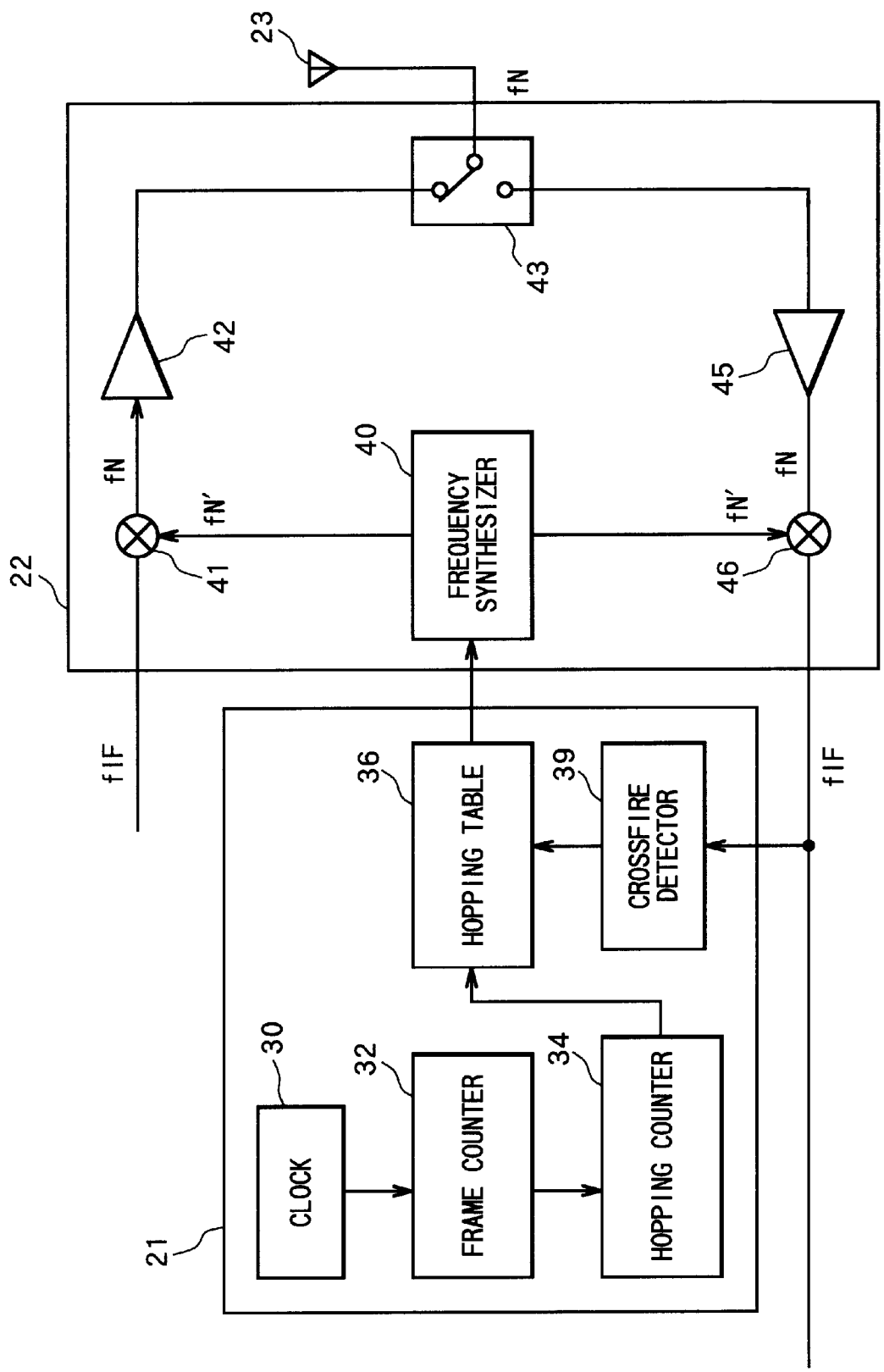
FIG. 2 is a block diagram showing the circuit configuration in the necessary portions of the base unit and handsets.

The wireless communication system of the present embodiment includes one base unit 10 that connects to an external telephone circuit and three handsets 11–13 that can communicate wirelessly with the base unit 10, as shown in FIG. 1.

All of the handsets 11–13 and the base unit 10 include a hop frequency data generator 21 for generating hop frequency data used to switch the frequency according to a prescribed hopping pattern, and a communicating unit 22 that uses the hop frequency data provided by the hop frequency data generator 21 to create transmission signals by spreading input signals and to create output signals by despreading reception signals.

The hop frequency data generator 21 includes a clock 30; a frame counter 32 that is incremented every time an output signal is input from the clock 30; a hopping counter 34 that is incremented every time a hopping start signal is input from the frame counter 32; and a hopping table 36 that stores a prescribed hop frequency data array. The hop frequency data generator 21 reads hop frequency data from the hopping table 36 based on values input from the hopping counter 34 and generates hop frequency data in the form of output signals. As described above, the frame counter 32, hopping counter 34, and hopping table 36 can be separate units, or they can be replaced with a logic computation process performed by a CPU, which is well-known in the art.

The communicating unit 22 is provided with an antenna 23, a frequency synthesizer 40 for transmitting signals at a transmission frequency $f_N'$ corresponding to the hop frequency data sent from the hop frequency data generator 21; a mixer 41 for mixing the transmission frequency $f_N'$ signals from the frequency synthesizer 40 with the frequency $f_{IF}$ input signals from the mouthpiece of a base unit or handset; an amplifier 42 for amplifying the frequency $f_H$ transmission signals output from the mixer 41; and an antenna switch 43 through which the signals pass to be transmitted from the antenna 23. For receiving signals, the communicating unit 22 is further provided with an amplifier 45 for amplifying frequency $f_N$ signals received by the antenna 23 and input via the antenna switch 43; and a mixer 46 for mixing the frequency $f_N$ signals with the above described transmission frequency $f_N'$ signals from the frequency synthesizer 40 to generate frequency $f_{IF}$ output signals. Transmission and reception operations are performed one at a time, corresponding to the position of the antenna switch 43.

The hop frequency data generator 21 is further provided with a crossfire detector 39 for detecting bit errors in the output signals received from the communicating unit 22. This crossfire detector 39 detects bit errors using a prescribed error correction encoding method, in which prescribed redundant bits are added to the data bits before transmission. There are various methods of error correction encoding well-known in the art. In the transmission of digital sound data, for example, error correction encoding using BCH (Bose-Chaudhuri-Hocqueng) signals and RS (Reed-Solomon) signals are representative.

In addition to the main configuration described above, the base unit 10 and handsets 11–13 are also provided with such devices included in the base unit and handsets of ordinary cordless telephone devices, such as a receiver, transmitter, push buttons or the like for dialing, and various other buttons and switches. Since these devices are well-known in the art, they are not included in the diagrams or descriptions.

Next, the communication method used in the wireless communication system will be described.

Figures 3, 4:
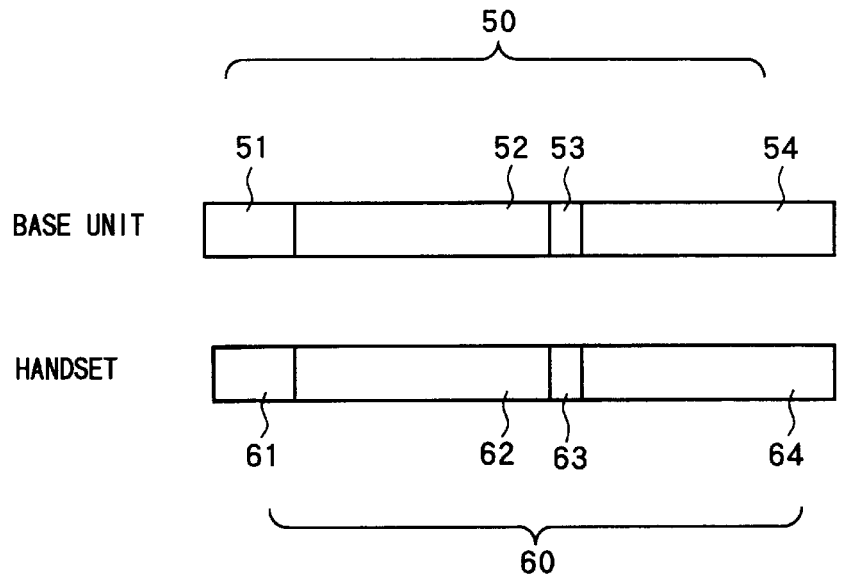
FIG. 3 is an explanatory diagram for a frame, which is a unit of communication used in bi-directional communications.

The wireless communication system of the present invention performs bi-directional communication using time-division multiplexing. In other words, when communication is performed between the base unit 10 and one of the handsets 11–13, the base unit 10 operates in units of frames 50, while the handsets 11–13 operate in units of frames 60, as shown in FIG. 3. The frames 50 for the base unit 10 include a frequency hop phase 51, transmission phase 52, transmission/reception switch phase 53, and reception phase 54. The frames 60 for the handsets 11–13 include a frequency hop phase 61, reception phase 62, transmission/reception switch phase 63, and transmission phase 64. The timing for the starting and ending point of each phase in the frame is predetermined, and switching to the next phase is controlled based on output signals from the frame counter 32.

After a frame switch, the transmission/reception frequency in a transit state is stabilized in the frequency hop phases 51 and 61, and transmission/reception between the communicating devices is not performed during this time.

During the transmission phase 52 in the base unit 10 (the reception phase 62 in the handsets 11–13), signals are transmitted from the base unit 10 to the handsets 11–13. In addition to the signals input from the mouth piece, the signals transmitted at this time include control signals, such as synchronization signals necessary to maintain frame synchronicity between the base unit 10 and the handsets 11–13; calling signals for calling the handsets 11–13; connection acknowledgment signals for indicating a call from the handsets 11–13 was received; and busy signals for indicating the base unit 10 is currently performing communication operations.

Synchronization signals consist of a specific bit array contained at a specified location in the transmitted bits. If the handsets 11–13 detect this bit array in the received signals, the frame counter 32 of the handset is reset so the position of the bit array conforms to the above specified location. If the base unit 10 completes transmission of the above specified bit array when the value of the frame counter 32 is m, for example, the handsets 11–13 that receive this bit array forcibly reset the frame counter 32 to the value m after reception of the bit array is complete. Hence, the frame counter 32 in the handsets 11–13 conforms to the frame counter 32 in the base unit 10. Thereafter, the base unit 10 and handsets 11–13 each control incrementing of their frame counter 32 according to pulse signals from their own clock 30, which is sufficient to synchronize the frame switches in both. If this synchronization adjustment is performed at appropriate times, no great disparity in the timing of frame switches will occur between the base unit 10 and the handsets 11–13, even if a slight error occurs in the pulse intervals output from one of the clocks 30.

The calling signal is the first signal sent by the base unit 10 to begin communications with one of the handsets 11–13 and includes the ID number of the handset with which to link. The connection acknowledgment signal, on the other hand, is the signal transmitted by the base unit 10 to indicate communication is possible in response to a calling signal sent from one of the handsets 11–13. Communication with the handset that sent the calling signal begins on the next frame following transmission of the connection acknowledgment signal. A busy signal indicates that the base unit 10 is currently engaged in communication. The signal includes an ID indicating with which handset the base unit 10 is communicating.

The transmission/reception switch phases 53 and 63 are transitional periods in the base unit 10 and handsets 11–13 in which the roles of transmitter and receiver are switched. No communication is performed during this period.

During the reception phase 54 in the base unit 10 (the transmission phase 64 in the handsets 11–13), signals are transmitted from the handsets 11–13 to the base unit 10. In addition to voice and other data signals input from the mouthpiece of the handsets, the signals transmitted at this time include control signals, such as synchronization verification signals for replying that frame synchronicity with the base unit 10 has been achieved in the handsets 11–13; calling signals for calling the base unit 10 or one of the other handsets 11–13; connection acknowledgment signals for indicating a call from the base unit 10 or one of the other handsets 11–13 was received; and busy signals for indicating the handsets 11–13 is currently performing communication operations.

The synchronization verification signal is sent as confirmation when synchronization has been properly achieved. If this signal is not sent, the base unit 10 can assume that synchronization with the handsets 11–13 has not been achieved. The calling signal, connection acknowledgment signal, and busy signal are exactly the same as described above for the base unit 10, except the handsets 11–13 is transmitting the signal in this case.

As described above, a frame consisting of the above phases is used as the basic unit of communication in a wireless communication system of the present invention. Both transmission and reception take place in one frame, allowing bi-directional communication between communication devices to be performed through repeatedly executing transmission and reception over a plurality of frames.

Further, as will be explained in more detail later, communication between handsets 11–13 is also possible with this wireless communication system. To begin such handset-to-handset communication, in the same way as the base unit 10, the calling handset 11–13 operates in units of frames 50, each of which consists of the frequency hop phase 51, transmission phase 52, transmission/reception switch phase 53, and reception phase 54. In this way, bi-directional communication can be performed with a handset operating in units of frames 60, in the same way described above.

In the transmission phase, devices required for transmission perform transmission operations, but devices that are not required perform reception operations as in the reception phase.

Next, the frequency switching method used during communications will be described.

In the present wireless communication system using the frame units described above, spread spectrum communication is performed using a frequency hopping method while changing the frequency every frame.

More specifically, first the frame counter 32 is reset to zero in the hop frequency data generator 21. Then, the frame counter 32 counts pulse signals of the clock 30 from zero to a prescribed number. When the prescribed number is reached, the frame counter 32 is reset to zero. This process is executed repeatedly. The time required for the frame counter 32 to reach the prescribed number from zero is equivalent to the length of one frame. Hence, the beginning of a frequency hop phase can be determined from when the frame counter 32 is reset to zero.

The hopping counter 34 is incremented one every time a new frequency hop phase is entered. A new hop phase is entered every time the frame counter 32 is reset to zero. When the value N of the hopping counter (hereinafter referred to as "hop number N") reaches a predetermined maximum value n, the hop number N is reset to zero.

Next, the hop number N is used as an index parameter to read hop frequency data from the hopping table 36. The hop frequency data is output as an output signal.

In the case of the base unit 10, a hop frequency data array B as shown in FIG. 4(a) is stored in the hopping table 36. This hop frequency data array B consists of a plurality of hop frequency data $b_0$, $b_1$, $b_2$, . . . , $b_n$, . . . corresponding to the hop numbers 0, 1, 2, . . . , n, . . . For the handsets 11–13, the exact same frequency data array B is stored in the hopping table 36 along with hop frequency data arrays H1 and H2, as shown in FIG. 4(b). For hop numbers 0–3, the hop frequency data array H1 includes the same hop frequency data as stored in the hop frequency data array B. From hop numbers 4 and after, the hop frequency data array H1 contains its own characteristic hop frequency data $h1_4$, $h1_5$, . . . , $h1_n$, . . . Similarly, the hop frequency data array H2 contains the same hop frequency data as in the hop frequency data array B for hop numbers 0–3, but from hop number 4 and after contains its own characteristic hop frequency data $h2_4$, $h2_5$, . . . , $h2_n$, . . .

The hop frequency data array B is chosen for both communicating devices when performing base unit-to-handset communications. For communicating between two handsets, one of the hop frequency data arrays H1 or H2 is chosen depending on the combination of handsets. The handsets 11–13 in this embodiment are given the handset IDs #1–#3. When performing communications with two handsets, the hop frequency data arrays H1 and H2 are chosen for the lower ID numbers #1 and #2, respectively. This method of selecting hop frequency data arrays for handset to handset communications is significant when there are four or more handsets. There are always one less hop frequency data arrays than the number of handsets. With four handsets, for example, hop frequency data arrays H1–H3 are prepared. Accordingly, when two handsets communicate with each other the hop frequency array for the lowest ID number is selected. In this way, for two pairs of handsets to communicate simultaneously, the hop frequency data arrays can be chosen based on the ID numbers of the handsets, regardless of the combinations used. Since the number of possible combinations used for simultaneous communication equals half the number of handsets (truncated to an integer when there are an odd number of handsets), two combinations or more of handsets can perform communications simultaneously provided hop frequency data arrays are provided for at least the number of combinations. This method provides such advantages as being able to reduce the memory capacity necessary for storing the hop frequency data arrays. However, this method is not capable of determining a hop frequency data array simply by the ID numbers of the handsets. Hence, a more complex control system is necessary which maintains data indicating whether a hop frequency data array is in use, allowing each channel to be monitored.

Next, an example for base unit to handset communications will be described. If the hopping counter 34 is zero in a given frame, then the hop frequency data $b_o$ is provided to the frequency synthesizer 40, which transmits the transmission frequency $f_0'$. Then a frequency $f_{IF}$ input signal is converted to a transmission signal and output according to the transmission frequency $f_0'$ signal. Similarly, the frequency $f_0$ reception signal is converted to a frequency $f_{IF}$ output signal according to the same transmission frequency $f_0'$.

The hop number N of the above mentioned hopping counter 34 is incremented from zero to n, after which the hop number N begins again at zero. Corresponding to these changes in the hop number N, the hop frequency data generated by the hop frequency data generator 21 changes in the cycle $b_0, b_1, b_2, \ldots, b_n, b_0, \ldots$ Accordingly, the frequency $f_N$ ultimately used for transmission and reception cycles through $f_0, f_1, f_2, \ldots f_n, f_0, \ldots$ The hop frequency data $b_i$ and transmission/reception frequency $f_i$ have a one-to-one proportional relationship. Since the hop frequency data $b_1$–$b_n$ are set to pseudo-random numbers, the transmission/reception frequencies $f_1$–$f_n$ change randomly (hop) within a predetermined frequency band.

For communications between two handsets, the frequencies are changed randomly for each frame, as in the above example, but the hopping pattern is different from that used in base unit-to-handset communications because the selected hop frequency data array is different. If the hop frequency data array H1 has been selected, for example, the hop frequency data $b_0, b_1, b_2, b_3, h1_4, \ldots, h1_n, b_0, \ldots$ will be generated from the hop frequency data generator 21 changing along with increments to the above hopping counter 34. Accordingly, the frequencies $f_N$, which are ultimately used for transmission and reception, will change according to the pattern $f_0, f_1, f_2, f_3, g_4, \ldots, g_n, f_0, \ldots$ A period is provided for each of the hop frequency data arrays B, H1, and H2, in which the hop frequency data $b_0$–$b_3$ is generated. These frames (hereinafter referred to as the control frames) are provided for the transmission and reception between all communicating devices of the various control signals. The system used in the present embodiment contains a total of four control frames because one base unit and three handsets are used. The number of control frames can be increased to a predetermined maximum number to allow for the addition of more handsets. With these control frames, communication is possible between all communicating devices using any of the hop frequency data arrays B, H1, or H2, because transmission and reception is performed using the common frequencies $f_0$–$f_3$. However, a predetermined sequence must be followed for transmission and reception between the base unit 10 and handsets 11–13 in order to prevent two or more communicating devices from transmitting at the same time. Further, during frames other than the control frames, conflicts will not occur between channels if transmission and reception is performed between two communicating devices according to the prearranged order, because the transmission and reception frequencies are only used for those two communicating devices.

In addition, hop frequency data $b_{n+1}, b_{n+2}, \ldots$ is prepared in the hop frequency data array B of the hopping table 36 for the hop numbers n+1 and after. This data is used when a bit error is detected with the prearranged hop frequency data by the crossfire detector 39. While this is a variation of the current embodiment, if the crossfire detector 39 detects a bit error in reception signals when the hop frequency data generator 21 generates the hop frequency data $b_1$, for example, the frequency data corresponding to hop number 1 in the data array B is updated with the frequency data $b_{n+1}$, and thereafter the hop frequency data generator 21 generates hop frequency data in the sequence $b_0, b_{n+1}, b_2, \ldots$ Thus, if a communicating device is receiving interference in a particular area as a result of using the frequency $f_1$, for example, use of the frequency $f_1$ is discontinued, reducing the chances of receiving further interference.

Next, the transmission/reception process executed by the base unit will be described. This process will use the hop frequency data array B.

Figure 5:
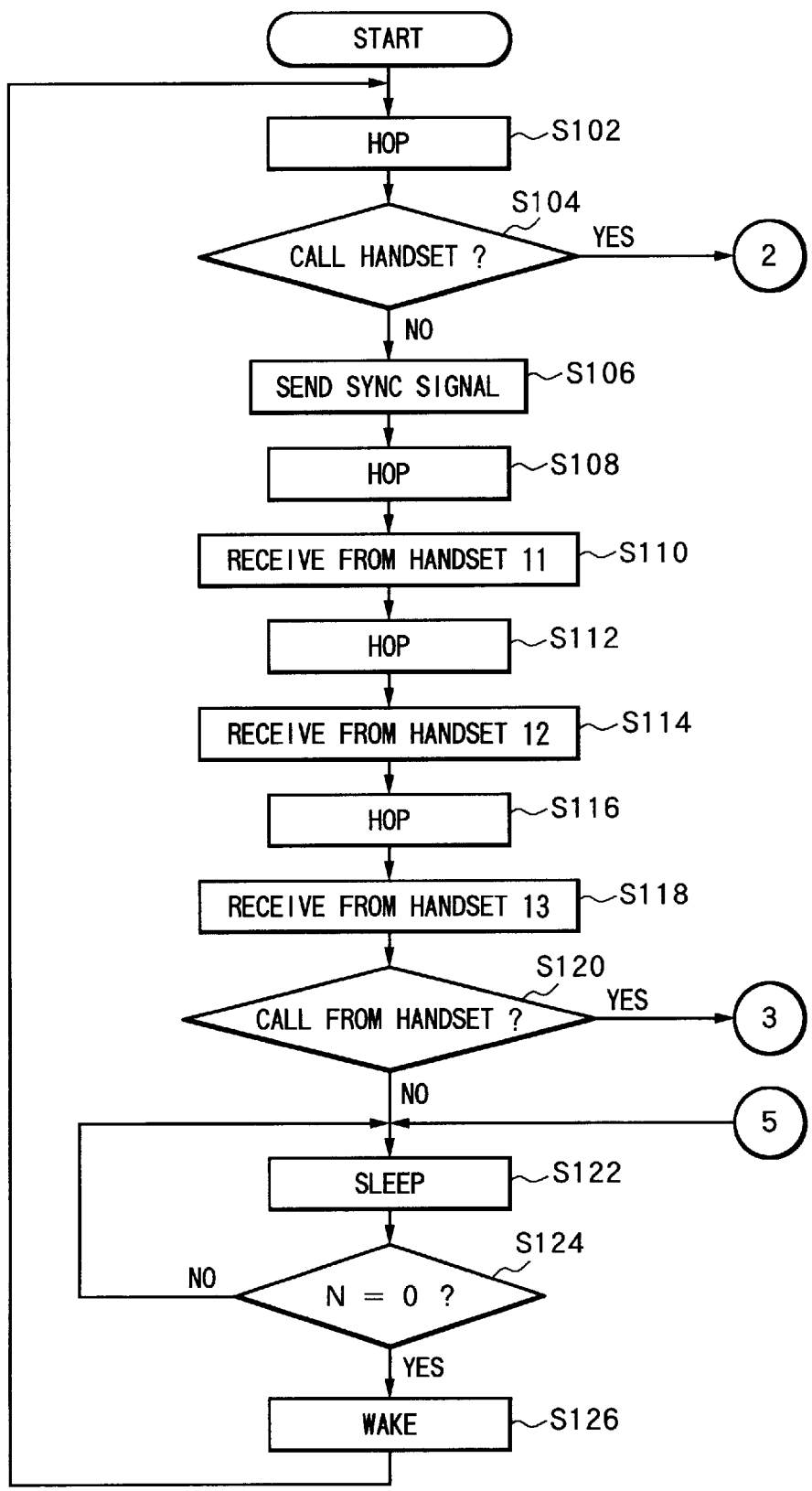
FIG. 5 is a first flowchart showing the transmission and reception processes of the base unit.

As shown in FIG. 5, the base unit hops to a prescribed frequency (S102) when the hop number N is reset to zero. Here, the series of control frames begins.

Next, the base unit checks whether to call a specified handset (S104). If the base unit is not calling a handset (S104: no), then the base unit sends a synchronization signal during the transmission phase of the frame (S108) and receives control signals from the handset 11 during the reception phase (S110). Then, the hop number N is incremented, and the base unit hops to the next frequency (S112). In the reception phase of that frame, the base unit receives control signals from the handset 12 (S114). The hop number N is incremented once again, and the base unit hops to the next frequency (S116). In the reception phase of the frame, the base unit receives control signals from the handset 13 (S118). The control signals received from each of the handsets contains the above described synchronization verification signal and might contain a call signal to the base unit 10. The base unit 10 checks for the existence of a call signal from any of the handsets (S120).

If there are no call signals from any of the handsets (S120: no), various parts of the base unit 10 enter a power-saving sleep state (S122). From this point, while the hop number N has not been reset to zero (S124: no), the base unit 10 remains in a sleep state. When the hop number N is reset to zero (S124: yes), the various parts of the base unit 10 are wakened out of the power-saving state (S126), and the process returns to step S102.

Figure 6:
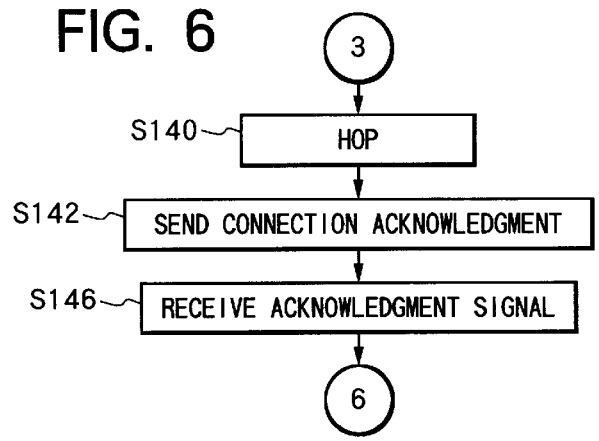
FIG. 6 is a second flowchart showing the transmission and reception processes of the base unit.

FIG. 6 shows the process followed if the base unit 10 receives a call signal from a handset in step S120 above (S120: yes). The hop number N is incremented, and the base unit hops to the next frequency (S140). Except during the control frames, a connection acknowledgment signal is transmitted during the transmission phase (S142). After reception of an acknowledgment signal during a reception phase (S146), conversation between the base unit and handset can begin from the following frame.

Figure 7:
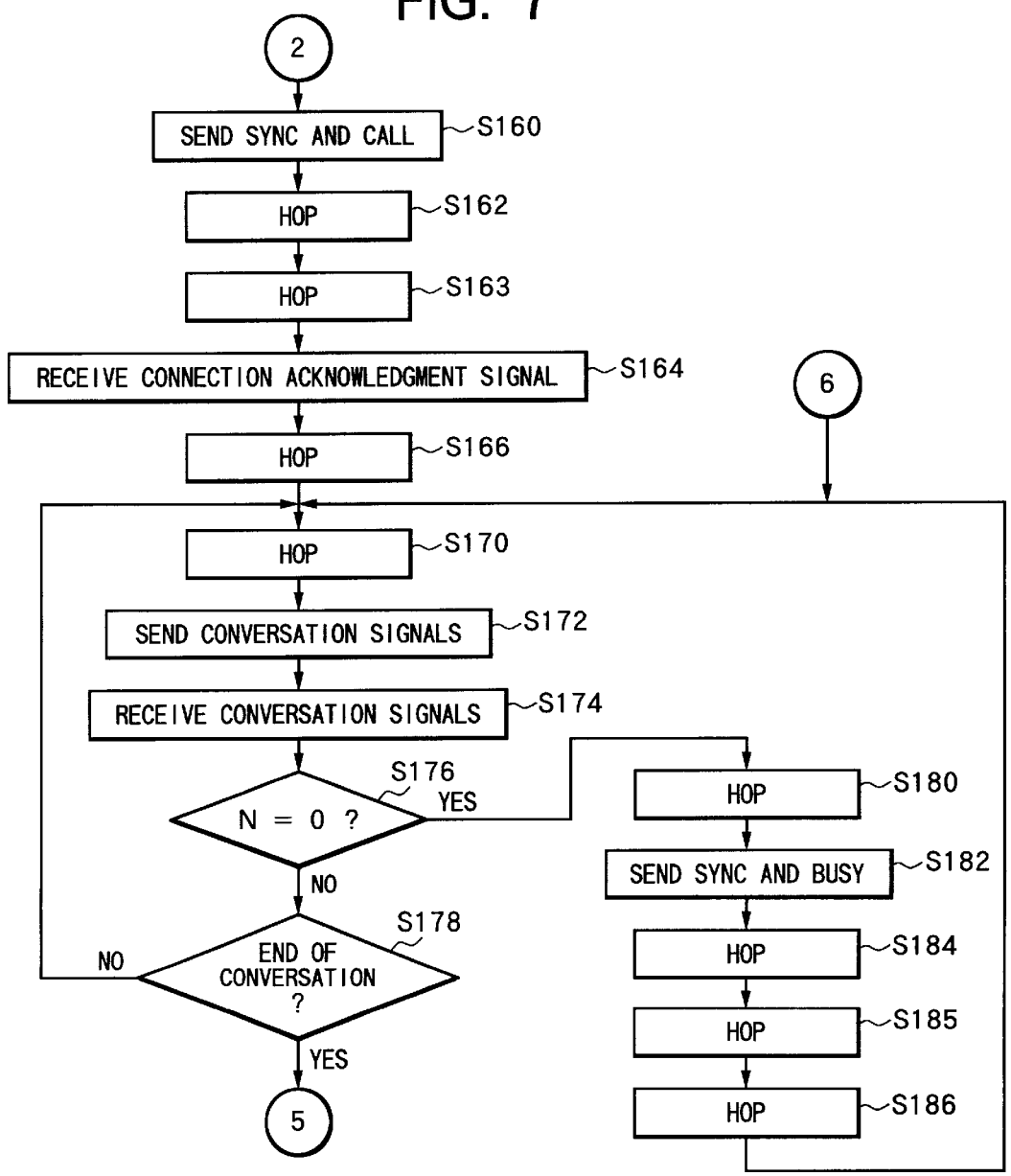
FIG. 7 is a third flowchart showing the transmission and reception processes of the base unit.

When the base unit 10 is calling a handset in step S104 of FIG. 5 (S104: yes), the base unit 10 transmits a calling signal for the specific handset along with the synchronization signals during the transmission phase of the frame (S160), as shown in FIG. 7. If an ID indicating handset 12, for example, is included in the calling signal, the calling signal itself is actually received by all of the handsets 11–13, but these communicating devices can recognize that the calling signal is intended for the handset 12. Here, the description of calling the handset 12 will be continued.

Next, the hop number N is incremented, and the base unit 10 hops to the next frequency twice (S162, S163). During the reception phase of the frame, the base unit 10 receives a connection acknowledgment signal from the handset 12 (S164). Once again the base unit 10 hops to the next frequency (S166), and conversation between the base unit 10 and the handset 12 begins in the second frame after the control frames. During the hopped frames between steps S162 and S166, the base unit 10 receives control signals from each of the handsets 11–13, but requests for connection to the base unit 10 and the like are invalid. At this point, and also after the completion of step S146 in FIG. 6, conversation between the base unit and handset begins. If a connection acknowledgment signal is not received from the handset because the handset is engaged in a call, the handset is not synchronized with the base unit, the handset is not within communication range, the battery in the handset has insufficient charge, or a similar reason, then an audio signal emits from the receiver of the base unit, for example, to indicate the call cannot be completed.

Next, the hop number N is incremented, and the base unit 10 hops to the next frequency (S170). Communication between the two communicating devices begins in this frame, as the base unit 10 sends conversation signals during the transmission phase of the frame (S172) and receives conversation signals from the handset 12 during the reception phase of the same frame (S174).

If the hop number N has not been reset to zero at this point (S176: no), then the base unit checks whether the conversation is not over (S178). If the conversation is over (S178: no), the process returns to step S170 and communication between the base unit and handset continues. If the conversation is over (S178: yes), then the process shifts to step S122 of FIG. 5.

If in step S176 the hop number N has been reset (S176: yes), the base unit 10 hops to the next frequency (S180), and synchronization signals and busy signals are sent during the transmission phase of the control frames (S182). Then, the base unit 10 repeatedly hops to the subsequent frequencies (S184–S186), and the process returns to step S170, where conversation continues between the base unit and handset. During the frames in steps 184–186 in which frequencies are hopped, control signals are received from each of the handsets 11–13. However, requests from one of the handsets to connect with the base unit 10 will be ineffective.

In response to the above described transmission and reception process performed by the base unit 10, the handsets 11–13 perform the following transmission and reception process. The example of the handset 12 will be described, but handsets 11 and 13 perform a similar process.

Figure 8:
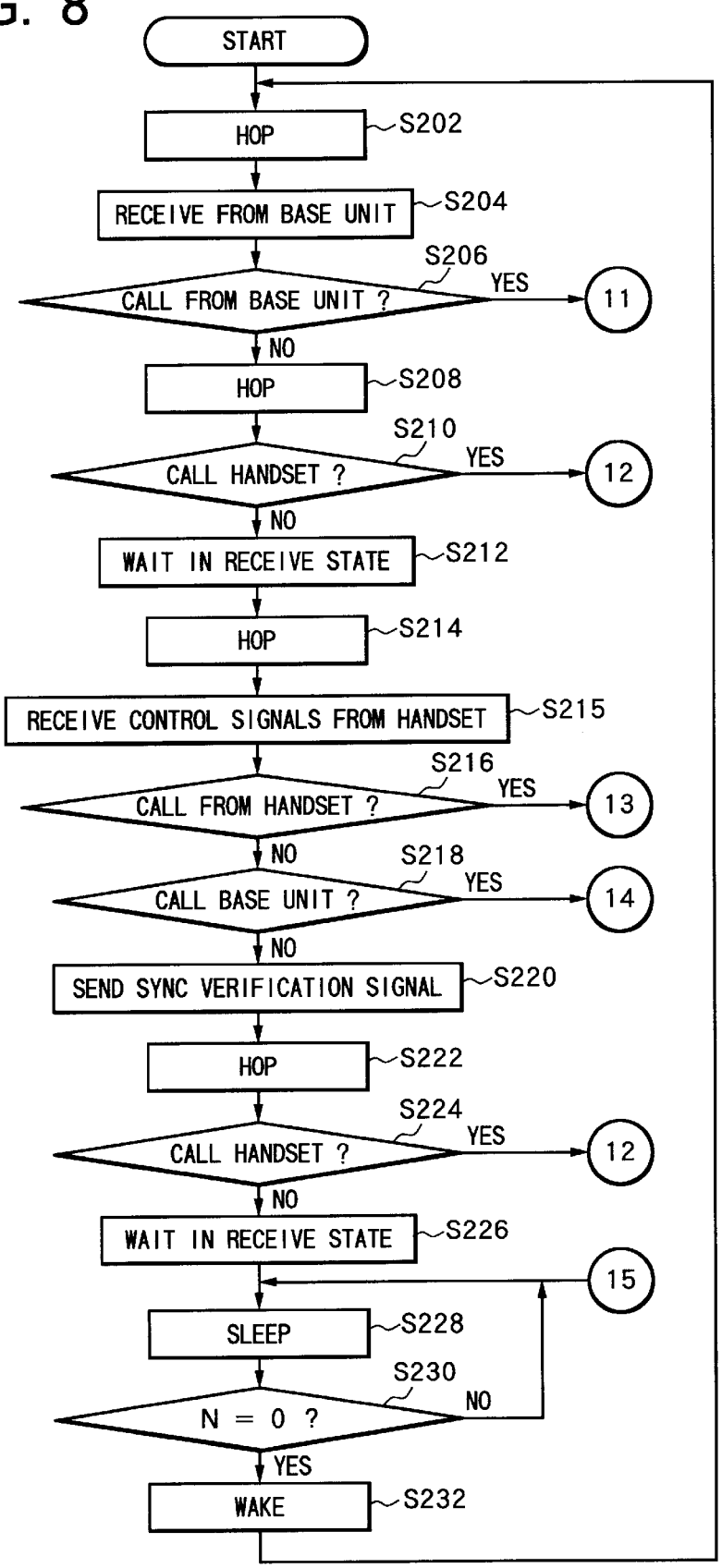
FIG. 8 is a first flowchart showing the transmission and reception processes of the handset.

As shown in FIG. 8, the hop number N is reset to zero, and the handset hops to a prescribed frequency (S202). The handset receives control signals from the base unit 10 during the reception phase of the control frame (S204). The received control signals contain synchronization signals and might contain a call signal from the base unit 10.

If the control signals do not contain a call signal from the base unit 10 (S206: no), then the hop number N is incremented and the handset hops to the next frequency (S208). Then the handset checks whether to call handset 11 (S210). If calling the handset 11 (S210: yes), conversation between two handsets, to be described later, begins in the next frame. When not calling the handset 11 (S210: no), the handset 12 waits in a receive state for both the reception and transmission phases of the frame (S212).

Next, the hop number N is incremented, and the handset 12 hops to the next frequency (S214). During the reception phase of this frame, the handset 12 receives control signals from either the handset 11 or the handset 13 (S215). If a call signal is contained in these control signals (S216: yes), then conversation between the two handsets begins in the next frame. If there are no call signals from the handset (S216: no), then the handset 12 checks whether to call the base unit 10 (S218). If the base unit 10 is to be called (S218: yes), then conversation between the base unit 10 and the handset 12 will begin in the next frame. However, if the base unit 10 is not to be called (S218: no), then synchronization verification signals are transmitted to the base unit 10 during the transmission phase of this frame (S220).

Next, the hop number N is incremented, and the handset 12 hops to the next frequency (S222). The handset 12 checks whether to call the handset 13 (S224). If the handset 13 is to be called (S224; yes), then conversation between the two handsets will begin in the next frame. However, if the handset 13 is not to be called, the handset 12 waits in a receive state for both the reception and transmission phases of the frame (S226).

Next, various parts of the handset 12 enter a power-saving sleep state (S228). From this point, while the hop number N has not been reset to zero (S230: no), the base unit 10 remains in a sleep state. When the hop number N is reset to zero (S230: yes), the various parts of the handset 12 are wakened out of the power-saving state (S232), and the process returns to step S202.

Figure 9:
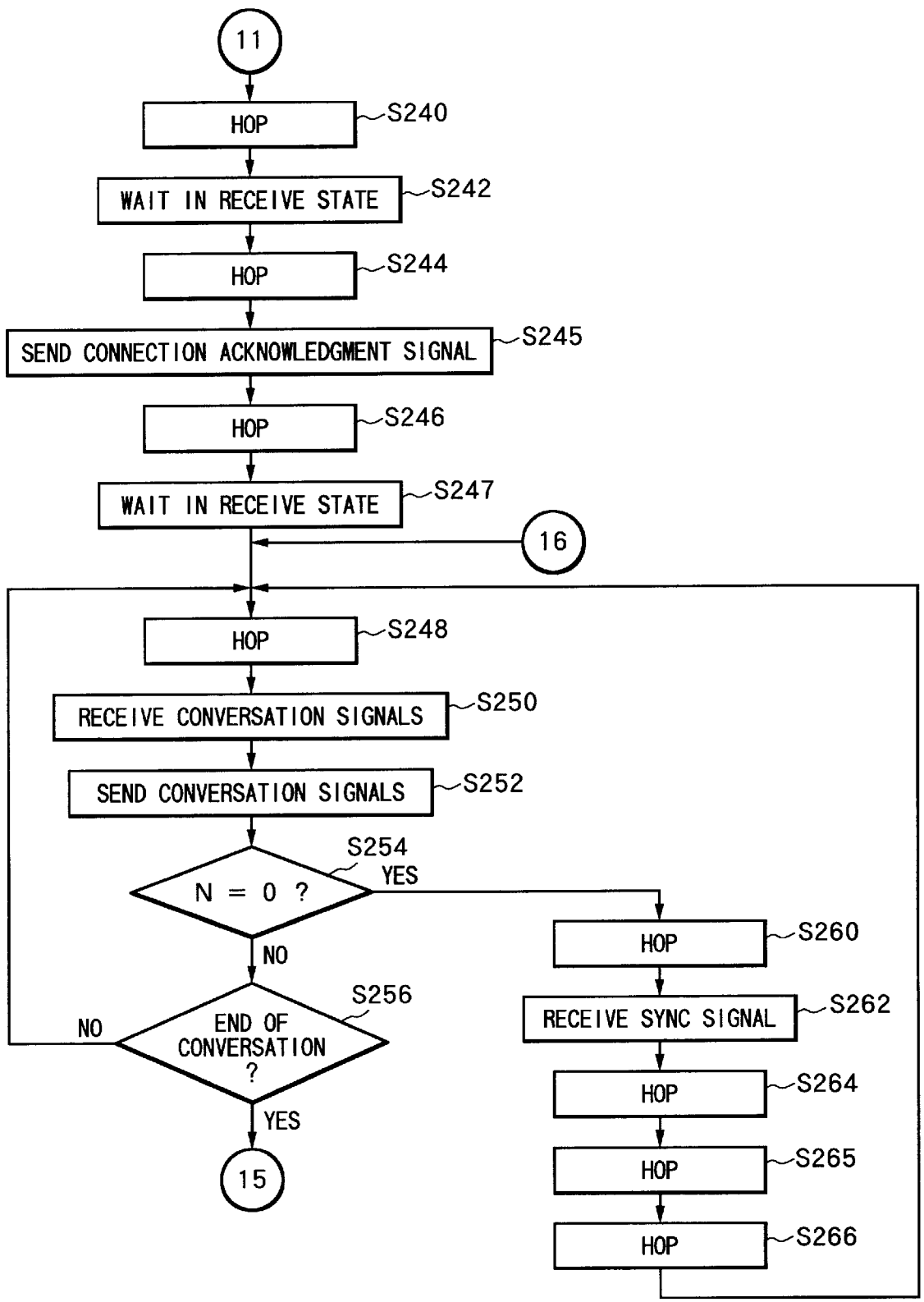
FIG. 9 is a second flowchart showing the transmission and reception processes of the handset.

In step S206 of FIG. 8, if calling signals are received from the base unit 10 (S206: yes), the hop number N is incremented, and the handset 12 hops to the next frequency (S240), as shown in FIG. 9. Then, the handset 12 waits in a receive state for both the reception and transmission phases of the frame (S242). Next, the hop number N is incremented, and the handset 12 hops again to the next frequency (S244) and sends a connection acknowledgment signal to the base unit 10 during the transmission phase of the frame (S245). Once again, the hop number N is incremented, and the handset hops to the next frequency (S246) and then waits in a receive state for both the reception and transmission phases of the frame (S247).

Next, the hop number N is incremented, and the handset hops to the next frequency (S248). Communication between the two communicating devices begins in this frame, as the handset 12 receives conversation signals from the base unit 10 during the reception phase of the frame (S250) and transmits conversation signals during the transmission phase of the same frame (S252).

If the hop number N has not been reset to zero at this point (S254: no), then the handset checks whether the conversation is over (S256). If the conversation is not over (S256: no), the process returns to step S248 and communication between the base unit and handset continues. If the conversation is over (S256: yes), then the process shifts to step S228 of FIG. 8.

If in step S254 the hop number N has been reset (S254: yes), the handset 12 hops to the next frequency (S260), and a synchronization signal is received during the reception phase of that frame (S262). Then, the handset 12 hops three times to the subsequent frequencies (S264–266) until the control frames have been cleared, and the process returns to step S248, where conversation continues between the base unit and handset.

Next, when calling another handset as in step S210 or S224 of FIG. 8 (S210: yes or S224: yes), the normal reception/transmission phase order of the handset 12 is reversed, and the following process is executed. The example given for this process is calling the handset 13, but the exact same process is used when calling the handset 11.

Figure 10:
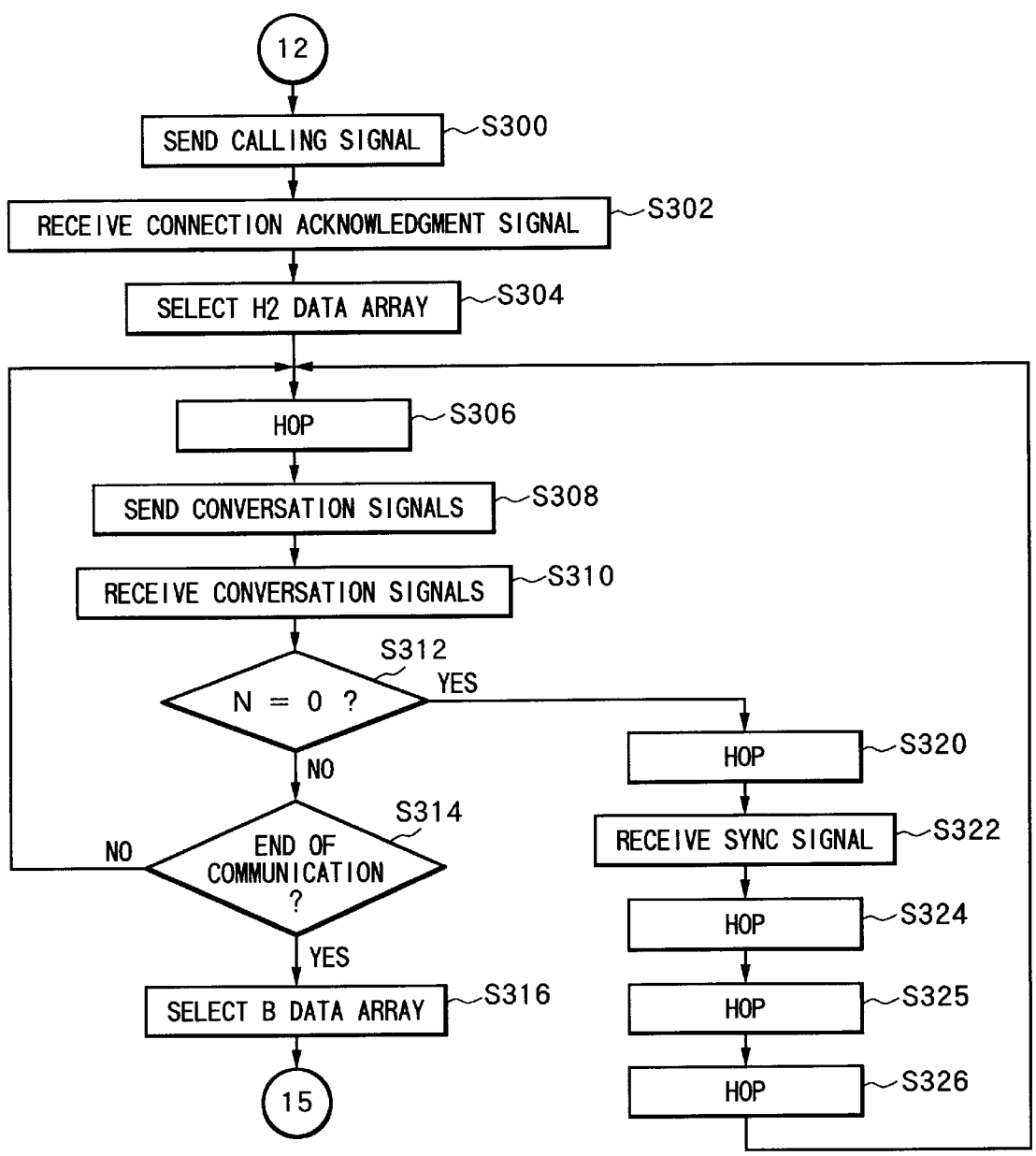
FIG. 10 is a third flowchart showing the transmission and reception processes of the handset.

As shown in FIG. 10, first a calling signal for calling the handset 13 is transmitted during the transmission phase of the frame (S300), and a connection acknowledgment signal is received from the handset 13 in the subsequent reception phase (S302). After verifying that a connection is possible between the two communicating devices in this way, conversation between the two communicating devices begins from the following frame, assuming communication with the handset 13, or after skipping the remaining two control frames, in the case of the handset 11. The hop frequency data array H2 is selected for the communication rather than the hop frequency data array B used thus far in the descriptions.

Next, the hop number N is incremented, and the handset hops to the next frequency (S306). Communication between the two communicating devices begins in this frame, as the handset 12 sends conversation signals during the transmission phase of the frame (S308) and receives conversation signals from the handset 13 during the reception phase of the same frame (S310).

Beginning from this frame, the handsets 12 and 13 both change the frequency for transmission and reception signals using the hop frequency data array H2. The frequencies used in this hop pattern will not conflict at all with the frequencies of the hop frequency array B, used between the base unit 10 and handset 11. In this way, two completely different channels are formed, and the base unit 10 and handset 11 can communicate at the same time as the handsets 12 and 13 without interfering with one another.

If the hop number N has not been reset to zero at this point (S312: no), then the handset checks whether the communication has ended (S314). If the communication has not ended (S314: no), the process returns to step S306 and communication between the handsets continues. If the conversation is over (S314: yes), then the hop frequency data array used is changed from H2 to B (S316), and the process shifts to step S228 of FIG. 8.

If in step S312 the hop number N has been reset (S312: yes), the handset 12 hops to the next frequency (S320). At this time, the hop frequency data array H2 continues to be used, but for the first four frames after the hop number N has been reset, the same hop frequency data is generated with either the data array H2 or the data array B, allowing control signals from the base unit 10 to be received. Accordingly, a synchronization signal is received from the base unit 10 during the reception phase of this frame (S322). Then, the handset 12 hops three times to the subsequent frequencies (S324–326) according to increments of the hop number N until the control frames have been skipped, and the process returns to step S306, where conversation continues between the two handsets.

Next, when a calling signal is received from another handset in step S216 of FIG. 8 (S216: yes), conversation between the two handsets begins. The example given for this process is a call from the handset 13, but the exact same process is used when a call comes from the handset 11.

Figure 11:
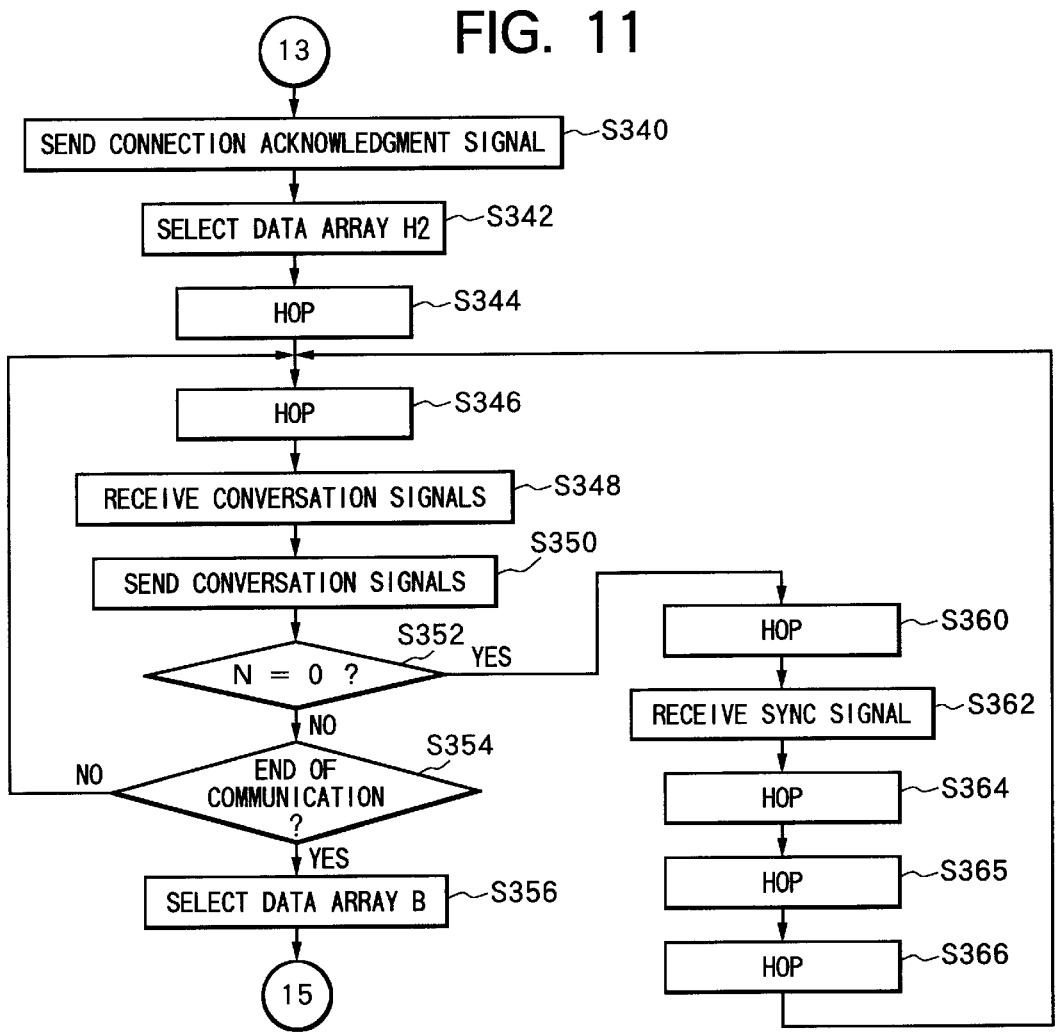
FIG. 11 is a fourth flowchart showing the transmission and reception processes of the handset.

As shown in FIG. 11, the handset 12 first sends a connection acknowledgment signal to the handset 13 during the transmission phase of the frame (S340). Then, the hop frequency data array B is replaced by the hop frequency data array H2 (S342).

Next, the hop number N is incremented, and the handset hops to the next frequency (S344). Once again the hop number N is incremented, and the handset hops to the next frequency (S346). Communication between the two communicating devices begins in this frame, as the handset 12 receives conversation signals during the reception phase of the frame (S348) and sends conversation signals to the handset 13 during the transmission phase of the same frame (S350).

Beginning from this frame, the handsets 12 and 13 both change the frequency for transmission and reception signals using the hop frequency data array H2. The frequencies used in this hop pattern will not conflict at all with the frequencies of the hop frequency array B, used between the base unit 10 and handset 11. In this way, two completely different channels are formed, and the base unit 10 and handset 11 can communicate at the same time as the handsets 12 and 13 without interfering with one another.

If the hop number N has not been reset to zero at this point (S352: no), then the handset checks whether the communication has ended (S354). If the communication has not ended (S354: no), the process returns to step S346 and communication between the handsets continues. If the conversation is over (S354: yes), then the hop frequency data array used is changed from H2 to B (S356), and the process shifts to step S228 of FIG. 8.

If in step S352 the hop number N has been reset (S352: yes), the handset 12 hops to the next frequency (S360). At this time, the hop frequency data array H2 continues to be used, but for the first four frames after the hop number N has been reset, the same hop frequency data is generated with either the data array H2 or the data array B, allowing control signals from the base unit 10 to be received. Accordingly, a synchronization signal is received from the base unit 10 during the reception phase of this frame (S362). Then, the handset 12 hops three times to the subsequent frequencies (S364–366) according to increments of the hop number N until the control frames have been skipped, and the process returns to step S346, where conversation continues between the two handsets.

Figure 12:
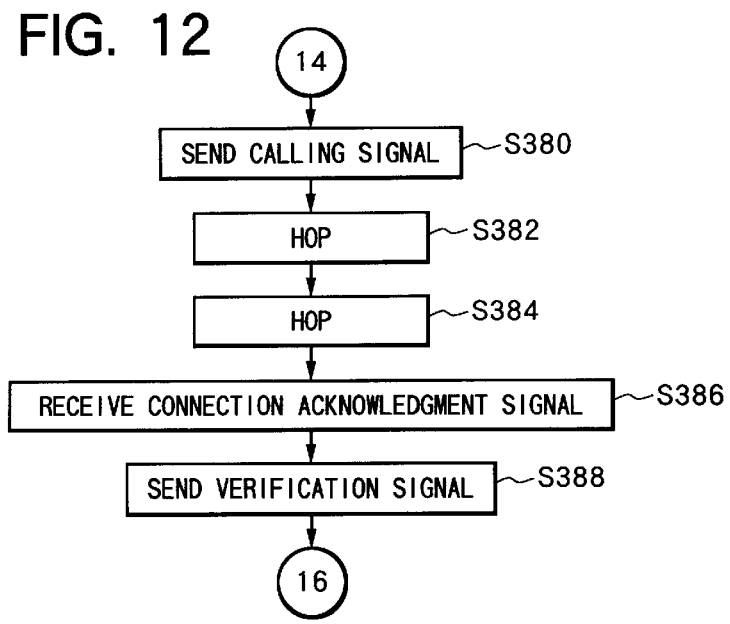
FIG. 12 is a fifth flowchart showing the transmission and reception processes of the handset.

Next, when the handset 12 is to call the base unit 10 in step S218 of FIG. 8 (S218: yes), the handset 12 sends a calling signal to the base unit 10 during the transmission phase of the frame (S380), as shown in FIG. 12. Then, the handset 12 hops twice to the subsequent frequencies (S382–384) according to increments of the hop number N until the control frames have been skipped, and the handset 12 receives a connection acknowledgment signal from the base unit 10 during the reception phase of that frame (S386). The handset 12 then sends a verification signal during the transmission phase of the frame (S388). The process shifts to step S248 shown in FIG. 9, and conversation between the base unit 10 and handset 12 described above begins in the next frame.

From the processes described above, direct and independent communication can be achieved between a base unit and handset or between two handsets.

Figure 13:
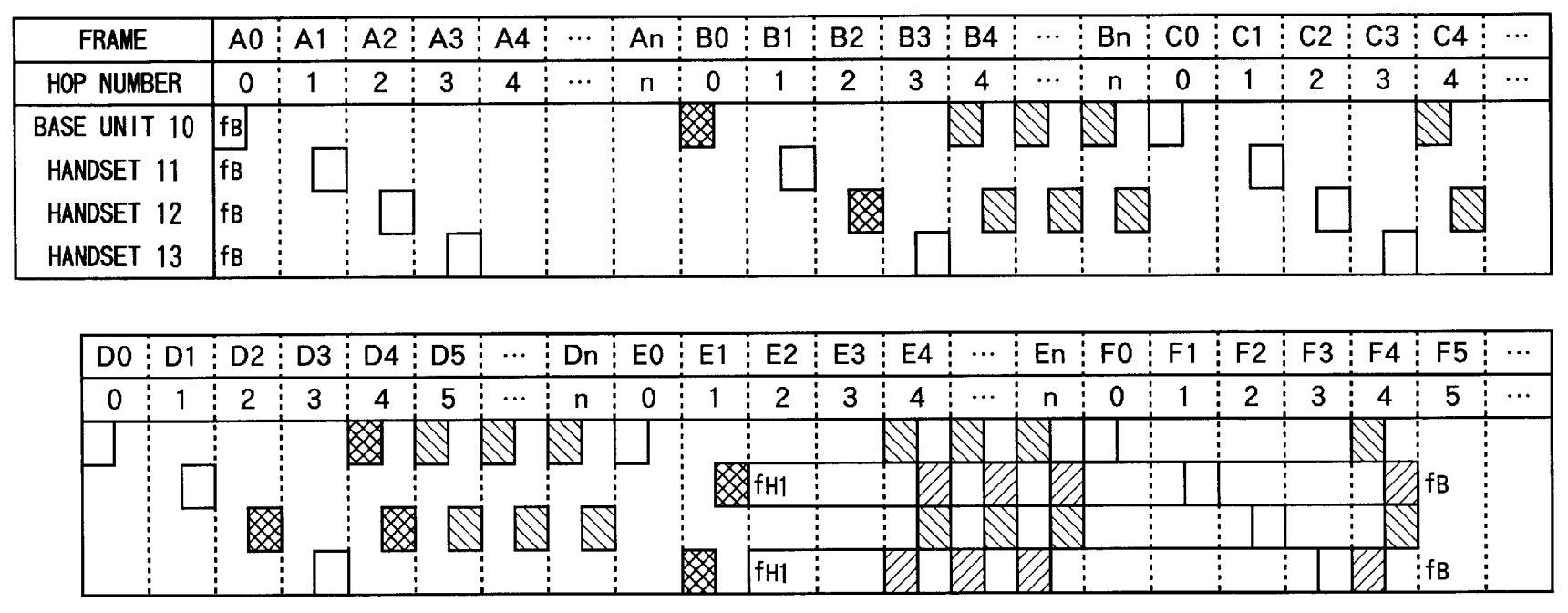

Next, the status of communication operations in the above processes will be described with reference to the diagram shown in FIG. 13. First, a description will be given of the base unit 10 and the handsets 11–13 in a waiting state.

When the hop number N is 0 and the frame is A0, the base unit 10 transmits control signals containing synchronization signals at a frequency $f_B$. The control signals are received by the handsets 11–13, which are then synchronized with the base unit 10. The square symbols in FIG. 13 represent transmission operations. Communicating devices not transmitting at a given time are in a receiving state. The frequency $f_B$ is the frequency that changes according to the hop frequency data array B described above. Although the frequency changes in the cycle $f_0, f_1, f_2, \ldots, f_n, f_0$, changing every frame each time the hop number N is incremented, these frequencies are simply represented by $f_B$ in this diagram. Until frame E2, which will be described later, each communicating device will transmit and receive using the frequencies $f_B$.

When the hop number N is incremented to 1 and frame changes to frame A1, the handset 11 transmits control signals containing synchronization verification signals using the frequency $f_B$. The control signals are received by the base unit 10. As the hop number N is further incremented and the frame changes to frame A2 and frame A3, the handsets 12 and 13 also send control signals containing synchronization verification signals to the base unit 10 using the frequency $f_B$.

When the hop number N is incremented to 4 and the frame changes to frame A4, the base unit 10 and all the handsets 11–13 enter a sleep state until the hop number is incremented to n and the frame changes to frame An. When the hop number N is reset to 0 and the frame changes to frame B0, the base unit 10 and all the handsets 11–13 return to a wake state.

In short, in a wait period, all communicating devices are in a wake state during the control frames, when the hop number N is between 0 and 3, and control signals are transmitted and received during this state. During the normal frames, when the hop number N is between 4 and n, however, the communicating devices are in a sleep state, during which time power consumption is restricted.

Next, calling the handset 12 from the base unit 10 will be described.

When the hop number N is reset to 0 and the frame changes to frame B0, the base unit 10 transmits control signals containing synchronization signals and calling signals using the frequency $f_B$. The control signals are received by the handsets 11–13. Then, when the hop number N is incremented to 1 and the frame changes to frame B1, the handset 11 sends control signals containing synchronization verification signals at the frequency $f_B$. These control signals are received by the base unit 10.

When the hop number N is incremented to 2 and the frame changes to frame B2, the handset 12 transmits control signals containing synchronization verification signals and connection acknowledgment signals using the frequency $f_B$. The control signals are received by the base unit 10. Then, when the hop number N is incremented to 3 and the frame changes to frame B3, the handset 13 sends control signals containing synchronization verification signals at the frequency $f_B$. These control signals are received by the base unit 10.

Next, the hop number N is incremented to 4 and the frame changes to frame B4. During the first phase of this frame, the base unit 10 transmits conversation signals at the frequency $f_B$, while the handset 12 receives these signals. During the second phase of the same frame, the handset 12 transmits conversation signals at the frequency $f_B$, while the base unit 10 receives these signals. Transmission and reception between the base unit 10 and the handset 12 continue in this way until the hop number N is incremented to n and the frame changes to frame Bn. During this time, the handsets 11 and 13 wait in a sleep state as described above.

Next, when the hop number N is reset to 0 and the frame changes to frame C0, both the handsets 11 and 13 are in a wake state. At this time, the base unit 10 transmits at the frequency $f_B$ control signals containing a synchronization signal and a busy signal, which are received by the handsets 11 and 13. Then, the hop number N is incremented to 1 and the frame changes to frame C1 during which frame the handset 11 transmits at the frequency $f_B$ control signals containing a synchronization verification signal.

Next, the hop number N is incremented to 2 and the frame becomes frame C2. Here, the handset 12, which has already established a link with the base unit 10, can, but need not, transmit control signals and the like to the base unit 10. When the hop number N is further incremented to 3 and the frame becomes frame C3, the handset 13 transmits at the frequency $F_B$ control signals containing a synchronization verification signal.

When the hop number N is incremented to 4 and the frame becomes frame C4, conversation between the base unit 10 and the handset 12 resumes. In the first phase, the base unit 10 transmits at the frequency $f_B$ conversation signals, which are received by the handset 12. In the second phase of the same frame, the handset 12 transmits at the frequency $f_B$ conversation signals, which are received by the base unit 10.

This pattern of transmitting and receiving control signals during the control frames, when the hop number N is between 0 and 3, and transmitting and receiving conversation signals between the base unit 10 and the handset 12 during the normal frames, when the hop number N is between 4 and n, is repeated until the conversation is ended. Transmission and reception of conversation signals is interrupted during the control frames, but only for a few milliseconds. Therefore, the user's conversation does not appear to be interrupted.

Further, while engaged in conversation, the base unit 10 does not process synchronization verification signals from the handsets 11 and 13 during frames C1 and C3. Accordingly, the handsets can be configured to not send control signals during frames C1 and C3 if a busy signal has been received from the base unit 10 in frame C0. Further, if the handsets 11 and 13 receive a calling signal from the base unit 10 for the handset 12 or a busy signal from the base unit 10 while the same are performing a calling process to either the base unit 10 or the handset 12, the user executing the calling process can be notified that the base unit 10 or handset 12 is in use.

Next, a call from the handset 12 to the base unit 10 will be described.

First, when the hop number N is reset to 0 and the frame becomes frame D0, the base unit 10 transmits at the frequency $f_B$ control signals containing a synchronization signal and a calling signal, which are received by the handsets 11–13. When the hop number N is incremented to 1 and the frame changes to frame D1, the handset 11 transmits at the frequency $f_B$ control signals containing a synchronization verification signal, which are received by the base unit 10.

When the hop number N is incremented to 2 and the frame changes to frame D2, the handset 12 transmits at the frequency $f_B$ control signals containing a synchronization verification signal and a calling signal, which are received by the base unit 10. When the hop number N is incremented to 3 and the frame changes to frame D3, the handset 13 transmits at the frequency $f_B$ control signals containing a synchronization verification signal, which are received by the base unit 10.

Next, the hop number N is incremented to 4 and the frame changes to frame D4. In the first phase of the frame, the base unit 10 transmits at the frequency $f_B$ a connection acknowledgment signal, which is received by the handset 12. In the second phase of the same frame, the handset 12 transmits at the frequency $f_B$ a verification signal, which is received by the base unit 10. During this time, the handsets 11 and 13 are waiting in a sleep state, as described above.

Next, the hop number is incremented to 5 and the frame changes to frame D5. During the first phase of this frame, the base unit 10 transmits at the frequency $f_B$ conversation signals, which are received by the handset 12. During the second phase of the same frame, the handset 12 transmits at the frequency $f_B$ conversation signals, which are received by the base unit 10. In this way, conversation signals are transmitted and received between the base unit 10 and the handset 12 until the hop number N becomes n and the frame changes to frame Dn.

Next, a call from the handset 13 to the handset 11 will be described. This example assumes that the base unit 10 and the handset 12 are still engaged in conversation, but the process would not change if the base unit 10 and handset 12 were in a wait state.

First, when the hop number N is reset to 0 and the frame changes to frame E0, both the handset 11 and 13 are in a wait state. During this frame, the base unit 10 transmits at the frequency $f_B$ control signals containing a synchronization signal and a busy signal, which are received by the handsets 11–13.

Next, the hop number N is incremented to 1 and the frame changes to frame E1. During the first phase of this frame, the handset 13 transmits at the frequency $f_B$ a calling signal, which is received by the handset 11. During the second phase of the same frame, the handset 11 transmits at the frequency $f_B$ a connection acknowledgment signal, which is received by the handset 13. In other words, the calling handset transmits a calling signal during the reception phase of the answering handset and in the frame that the answering handset transmits control signals. Then, in the same frame, the answering handset immediately transmits a connection acknowledgment signal to the calling handset during the transmission phase for the answering handset.

When the hop number N is incremented to 2 and the frame changes to frame E2, both the handsets 11 and 13 change the hop frequency data array from B to H1.

After the hop number N is incremented twice to 4 and the frame changes to frame E4, conversation between the base unit 10 and the handset 12 resumes. During the first phase of this frame, the base unit 10 transmits at the frequency $f_B$ conversation signals, which are received by the handset 12. During the second phase of the same frame, the handset 12 transmits at the frequency $f_B$ conversation signals, which are received by the base unit 10.

At the same time communication between the base unit 10 and the handset 12 resumes, conversation between the handsets 11 and 13 begins. During the first phase of this frame, the handset 13 transmits at the frequency $f_{H1}$ conversation signals, which are received by the handset 11. During the second phase of the same frame, the handset 11 transmits at the frequency $f_{H1}$ conversation signals, which are received by the handset 13.

The frequency $f_{H1}$ indicates the frequency that changes according to the hop frequency data array H1 described above. The frequencies used are represented simply by $f_{H1}$ in FIG. 13, but actually the frequencies change in the cycle $f_0, f_1, f_2, f_3, g_4, g_5, \ldots, g_n, f_0$, along with changes in the hop number N and the frame. The frequencies $f_0-f_3$ are used for transmission and reception when the hop number N is between 0 and 3, allowing control signals to be received from the base unit 10. However, the frequencies $g_4-g_n$ ($g_1 \neq f_1$) are used for transmission and reception when the hop number N is between 4 and n, allowing the handsets 11 and 13 to engage in communications at the same time as the base unit 10 and the handset 12 without the two pairs of communicating devices interfering with each other.

This pattern of transmitting and receiving control signals between the base unit 10 and the handsets during the control frames, when the hop number N is between 0 and 3, and transmitting and receiving conversation signals between linked communicating devices during the normal frames, when the hop number N is between 4 and n, is repeated until the conversation is ended.

When the hop number N is reset to 0 and the frame changes to frame F0, the base unit 10 transmits at the frequency $f_B$ control signals containing a synchronization signals and a busy signal, which are received by the handsets 11–13. From these control signals, even the handsets 11 and 13 are synchronized with the base unit 10. Assuming that communication between the handsets 11 and 13 ends when the hop number N is incremented to 4 and the frame changes to frame F4, the hop frequency data array used by these communicating devices is changed back from H1 to B in frame F5, and the two communicating devices enter a wait state.

In the above descriptions, conversation between a base unit and handset applies both to the handsets 11–13 communicating with an external communicating device via a telephone circuit and to internal communications between the base unit 10 and the handsets 11–13. Further, conversation between handsets applies to internal communications using the handsets 11–13.

In the wireless communication system of the present invention described above, the base unit 10 transmits control signals to all the handsets 11–13 at the same time, while each of the handsets 11–13 returns control signals to the base unit 10 in a specified order. In this way, the exchange of control signals between the base unit 10 and a plurality of handsets 11–13 can be performed more quickly than when the base unit transmits control signals to each handset one by one in order to match the individual receiving frequencies of the handsets.

Since the base unit 10 and the handsets 11–13 transmit and receive control signals during control frames that appear at regular predetermined intervals, both the base unit 10 and the handsets 11–13 can devote their time to other communication processes and transmit and receive control signals only during their specified time slots.

Further, in the wireless communication system of the present invention, communication between communicating devices is performed in units of frames that consist of a first phase, in which the base unit 10 transmits signals to the handsets 11–13, and a second phase, in which the handsets 11–13 transmit signals to the base unit 10. The base unit 10 transmits control signals during the first phase of a pre-scribed frame, and the handsets 11–13 transmit control signals in the frames following the prescribed frame above, with one handset transmitting per frame. Hence, in each frame, either the base unit 10 or one of the handsets 11–13 is transmitting signals. Therefore, it would be effective to have the same procedure for each frame, processing trans-missions from the base unit 10 in the first phase and transmissions from the handsets 11–13 in the second phase. Moreover, the reception phase of a frame is not used by the communicating device that transmits during that frame. This phase could be used to send control signals when data must be conveyed immediately.

The present invention is not limited to the above described embodiment, but can have many variations to the above description. Some useful variations to this embodiment are described below.

In the embodiment described above, the wireless communication system included hop frequency data arrays B, H1, and H2 for generating hop frequency data, a portion of which was the same for each data array. The wireless communication system further included a communicating unit 22 for transmitting and receiving control signals between the base unit 10 and the handsets 11–13. However, a separate control hop frequency data array C can be prepared in addition to the data arrays B, H1, and H2, as shown in FIG. 14. With this arrangement, the communicating unit 22 performs the transmission and reception of control signals between the base unit and handsets when the hop frequency data generator 21 generates the control hop frequency data array C. When conversation is performed between specified communicating devices, on the other hand, the hop frequency data arrays B, H1, or H2 are generated. Communicating devices in a wait state always execute synchronization adjustments and calling processes using the control hop frequency data array C, but when two communicating devices establish a link, the hop frequency data array is changed from C to either B, H1, or H2.

In this way, if the base unit and a handset are engaged in communication and control signals are sent to either of them from another communicating device, the control signals will not interfere with the communications, because the hop frequency data array C for control and the hop frequency data array B for communication are separated. Accordingly, a handset in a wait state can send control signals at any time. If the base unit and a handset are engaged in communication, a communicating device in a wait state can send a calling signal, for example, to another communicating device without waiting for the control frames.

The hop frequency data arrays C, B, H1, and H2 can all be provided with a similar frequency pattern in one part of the array in order to generate control frames for synchronization adjustments and the like. However, this configuration is not absolutely necessary because synchronization will not necessarily be lost if such synchronization adjustments are not made.

Further, there might be occasions when a handset cannot synchronize with the base unit, including in the embodiment described above. For this reason, the hop frequency data generator 21 in the handsets can be provided with the capability to send hop frequency data for recovering synchronization. This synchronization recovery hop frequency data is used to continue receiving at the frequency used by the base unit 10 to send synchronization signals. In the case of the embodiment described above, the hop frequency data generator 21 would continue to generate the hop frequency data $b_0$, regardless of the hop number N, in order to eventually receive synchronization signals from the base unit 10. Then, normal communications would continue from the point of receiving the signals.

Further, in the embodiment described above, communication was performed using the hop frequency data arrays B1, H1, and H2, but individual hop frequency data arrays could be prepared for each of the combinations: the base unit 10 and all the handsets 11–13; the base unit 10 and the handset 11; the base unit 10 and the handset 12; the base unit 10 and the handset 13; the handset 11 and the handset 12; the handset 11 and the handset 13; and the handset 12 and the handset 13. In this case, the memory capacity necessary for storing this data would be increased. However, when the crossfire detector 39 detects a bit error in the reception signals, modifications can be limited to the hop frequency data array used between specific devices. In this way, additional problems that could arise in other pairs of communicating devices when modifying the data array can be avoided.

Figure 15:
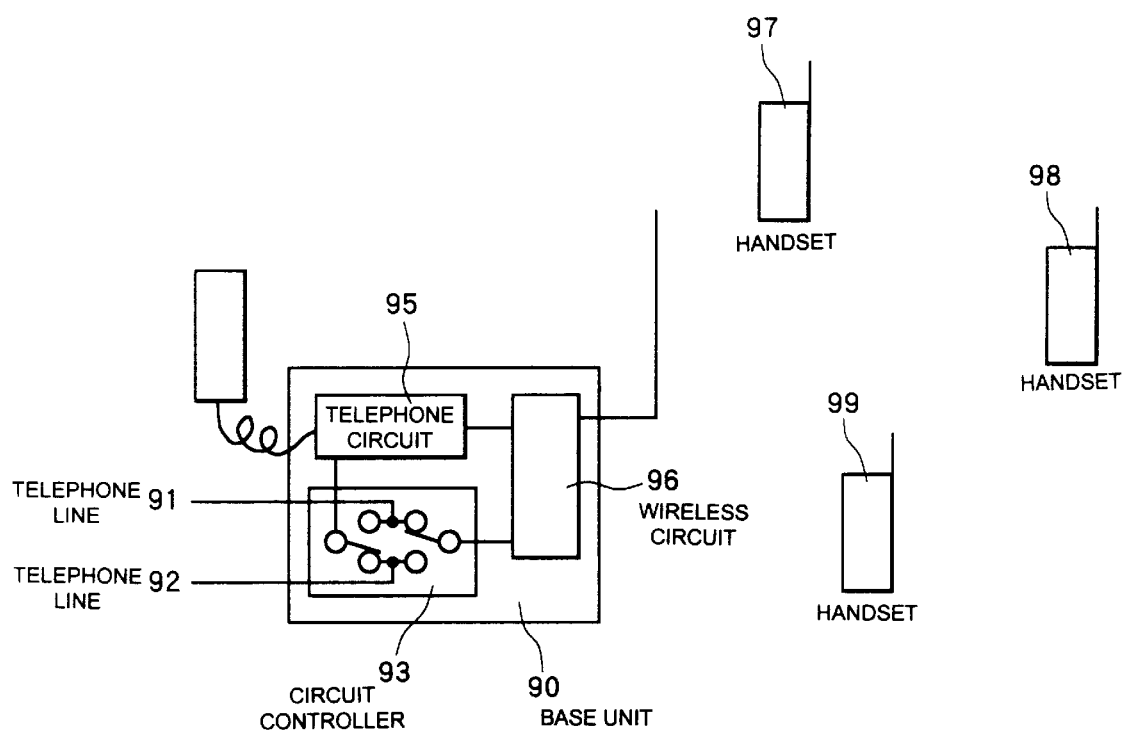
FIG. 15 is an explanatory diagram showing a wireless communication system whose base unit employs a different configuration.

The base unit 10 can be configured as a stationary device normally used with cordless telephones. The base unit 90 shown in FIG. 15 is convenient.

This base unit 90 includes a circuit controller 93, a telephone circuit 95, and a wireless circuit 96. Two telephone lines 91 and 92 are connected to the circuit controller 93. One of the telephone lines is connected to the telephone circuit 95 of the base unit 90, while the other is connected to the wireless circuit 96. The wireless circuit 96 forms wireless channels with handsets 97–99 to perform communications using the wireless communication system of the present invention.

When the base unit 90 is engaged in communications with an external telephone using the telephone circuit 95 via the telephone line 92, for example, the other telephone line 91 is automatically connected to the wireless circuit 96. Accordingly, one of the handsets 97–99 can communicate with an external telephone via the telephone line 91. In other words, both the base unit and a handset can communicate with external telephones at the same time. Moreover, while the base unit and handset are communicating with external telephones, the remaining handsets can communicate with each other, internally.

Next, a wireless communication system according to a second embodiment of the present invention will be described while referring to the accompanying drawings wherein like parts and components are designated by the same reference numerals to avoid duplicating description. The wireless communication system of the second embodiment is exactly the same as the system described in the first embodiment, except for the variations described below.

Figure 16:
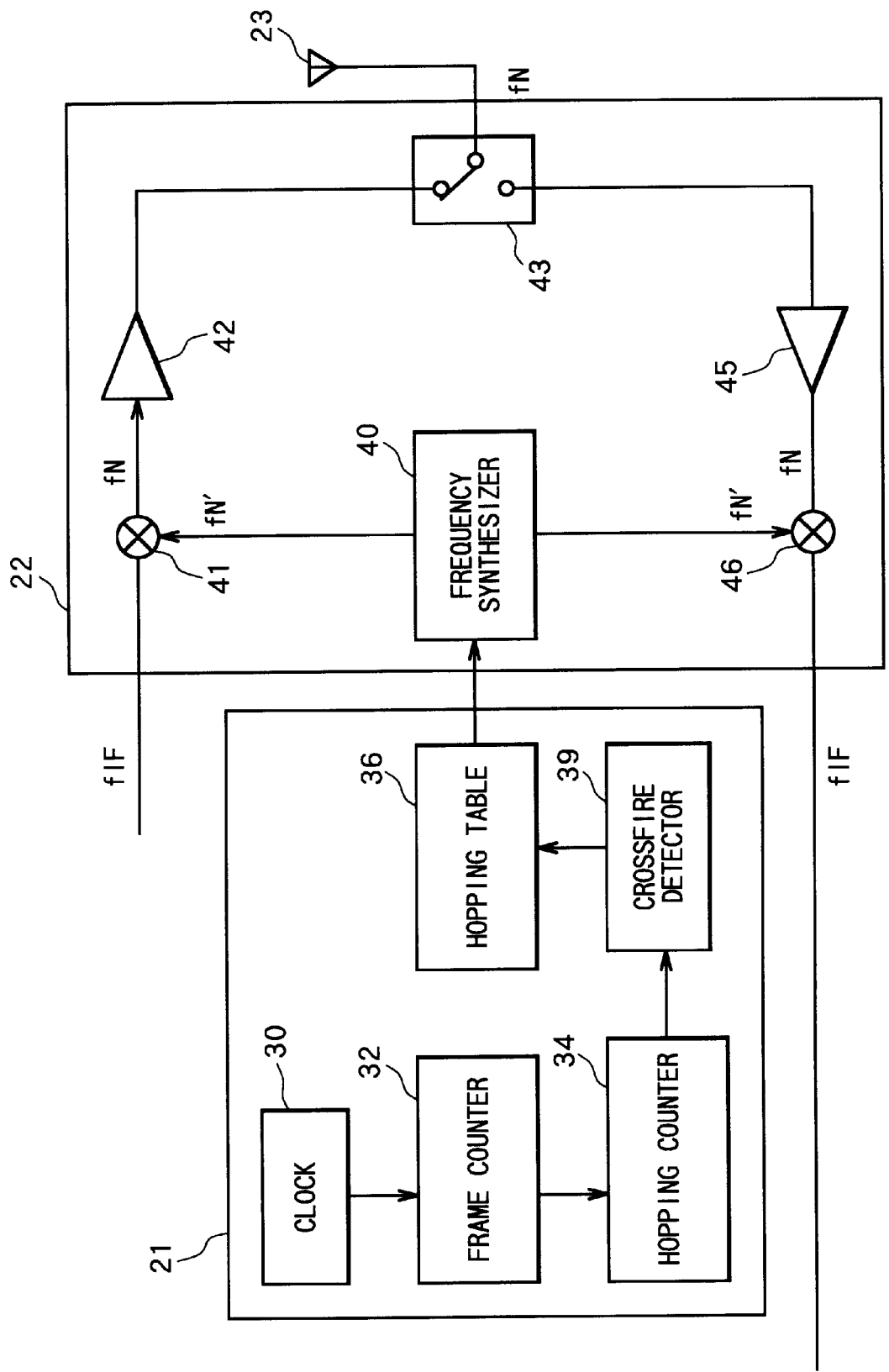
FIG. 16 is a block diagram showing the circuit configuration in the necessary portions of the base unit and handsets of the second embodiment.

As shown in FIG. 16, the base unit 10 and the handsets 11–13 have the same configuration as described in the first embodiment. However, in addition to the clock 30, frame counter 32, hopping counter 34, and hopping table 36, the hop frequency data generator 21 also includes a hopping controller 35 (the crossfire detector 39 is not included in the second embodiment). This hopping controller 35 receives the signals output from the hopping counter 34, performs a corrective addition on those signals, and outputs the resulting corrected output signal. The hop frequency data generator 21 then reads hop frequency data from the hopping table 36 based on values input from the hopping controller 35 that change every time and generates hop frequency data in the form of output signals. The frame counter 32, hopping counter 34, hopping controller 35, and hopping table 36 can be configured as separate units or can be replaced with a logic computation process performed by a CPU, which is well-known in the art.

In the wireless communication system of the second embodiment, the output from the hopping counter 34 is a counter value M. The hopping controller 35 converts this counter value M to a corrected value N (hereinafter referred to as "hop number N"). The method for correcting the counter value M will be described later in more detail, but every time the counter value M changes, a hop number N is output from hopping controller 35.

Figure 17:
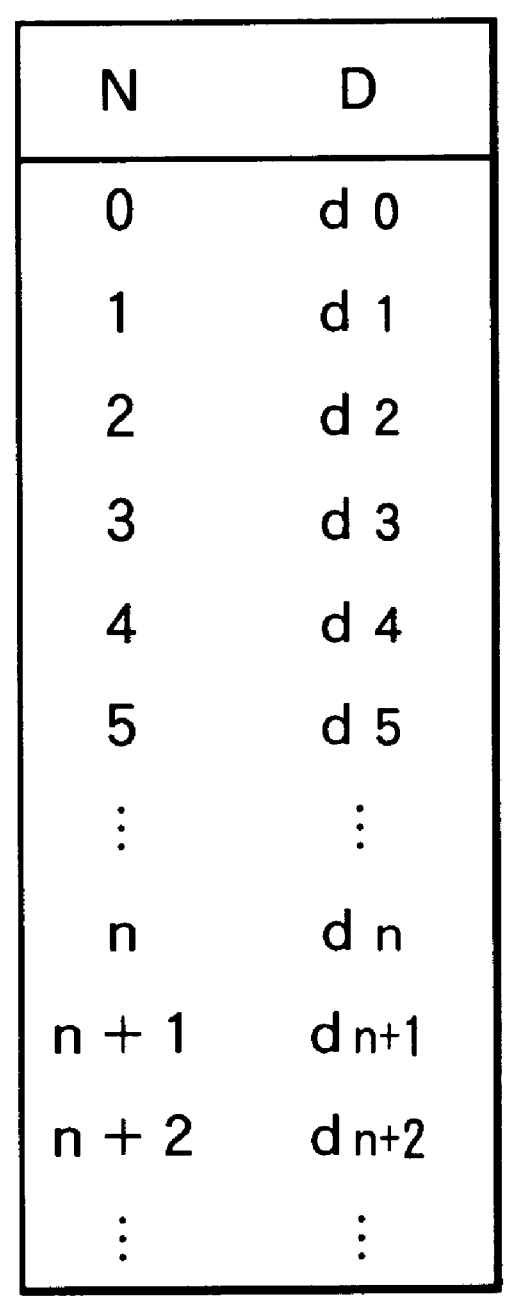

A hop frequency data array D, as shown in FIG. 17, is stored in the hopping table 36. This hop frequency data array D consists of a plurality of hop frequency data $d_0, d_1, d_2, \ldots, d_n, \ldots$ corresponding to the hop numbers $0, 1, 2, \ldots, n, \ldots$. Therefore, when the hop number n=i, the hop frequency data $d_i$ will be read from the hopping table 36 and output as output signals from the hop frequency data generator 21.

When provided with the hop frequency data $d_i$, the frequency synthesizer 40 transmits the transmission frequency $f_i'$. Then a frequency $f_{IF}$ input signal is converted to a transmission signal and output according to the transmission frequency $f_i'$ signal. Similarly, the frequency $f_i$ reception signal is converted to a frequency $f_{IF}$ output signal according to the same transmission frequency $f_i'$.

Since the hop frequency data generated by the hop frequency data generator 21 changes sequentially according to the hop number N as described above, the frequency $f_i$ ultimately used for transmission and reception in the communicating unit 22 also changes sequentially. The hop frequency data $d_i$ and transmission/reception frequency $f_i$, in particular, have a one-to-one proportional relationship. Since the hop frequency data $d_1$–$d_n$ are set to pseudo-random numbers, the transmission/reception frequencies $f_1$–$f_n$ change randomly (hop) within a predetermined frequency band.

As mentioned above, the counter value M of the hopping counter 34 is converted to a hop number N using a correcting method in the hopping controller 35. However, the correcting method used for communication between a base unit and handset is different from that used for communication between two handsets.

More specifically, for communication between a base unit and handset, the hopping controller 35 outputs the counter value M of the hopping counter 34 without change as the hop number N. Since communication between the base unit and handsets has the highest probability of occurring frequently, particularly when considering synchronization operations, extra conversion processes can be avoided by simply determining that the communication is between the base unit and a handset.

For communication between two handsets, the hopping controller 35 outputs the counter value M as the hop number N only when M is between 0 and 3. When M is between 4 and n, the sum of a prescribed value S added to the counter value M is output as the hop number N.

In the present system, the prescribed value S is either 2 or 4. More specifically, the handsets 11–13 are provided with ID numbers #1–#3, respectively. When two of the handsets communicate with each other, the prescribed value S equivalent to the value of the lowest ID among the two handsets doubled is selected. The method of selection is optional. However, using this type of method, two pairs of handsets can communicate simultaneously, regardless of which handsets are paired together, and prescribed values S separated by two or more can be reliably selected based on the ID numbers of the handsets. Moreover, since the ID numbers are doubled, the hop frequency data arrays are shifted at least two phases between pairs of handsets. Hence, the frequencies for the two channels will never be equal, even if disparity occurs in the timing for changing frequencies, and the two channels will not interfere with one another as a result.

Another possibility is to select the prescribed value S according to the ID number of the calling handset. Further, it is possible to prearrange S values for only the number of possible combinations, that is, half of the total number of handsets (truncated to an integer if the total number is odd).

Table 1 below shows the relationship between the counter value M of the hopping counter 34 and the hop number N when the prescribed values S are 2 and 4, using the correction method described above.

| M | 0 | 1 | 2 | 3 | 4 | ... | n−4 | n−3 | n−2 | n−1 | n |
|---|---|---|---|---|---|-----|-----|-----|-----|-----|---|
| N (S = 2) | 0 | 1 | 2 | 3 | 6 | ... | n−2 | n−1 | n | n+1 | n+2 |
| N (S = 4) | 0 | 1 | 2 | 3 | 8 | ... | n | n+1 | n+2 | n+3 | n+4 |

In short, when M is between 4 and n, the hop number N is shifted only the prescribed value S for either communication between the base unit and handset or communication between two handsets. When M is between 0 and 3, the shift using the prescribed value S is temporarily canceled, and the same hop number is used for communication between both pairs.

Frames in which the same hop number is used for base unit to handset communications and handset to handset communications (hereinafter referred to as control frames) are provided to allow the transmission and reception of control signals between all communication devices. Four frames are provided in the present system, but the number of frames must be set at least to the total number of base units and handsets. Therefore, the number of control frames can be set to a maximum number that allows for the possibility of adding more handsets.

Since transmission and reception is performed at the common frequencies $f_0$–$f_3$ during the control frames, transmission and reception is possible between all communicating devices during this time. Therefore, it is essential to follow a predetermined sequence for transmission and reception between the base unit 10 and handsets 11–13 during this time in order to prevent two or more communicating devices from transmitting signals simultaneously.

In frames other than the control frames, transmission and reception frequencies are only common for a pair of communicating devices engaged in communication. Therefore, no interference with other channels will occur. However, the pair of communicating devices must follow a predetermined order of transmission and reception.

In the description that follows, the hop frequency data array B refers to the data array output from the hop frequency data generator 21 when the hopping controller 35 outputs the counter M without change as the hop number N.

Also, the hop frequency data arrays H1 and H2 refer to data arrays output from the hop frequency data generator 21 when the hopping controller 35 corrects the counter value M using the prescribed values S=2 and 4, respectively, and outputs the result as the hop number N.

The transmission/reception process executed by the base unit in the second embodiment is exactly the same as the process of the first embodiment, shown in FIG. 5. Therefore, the description will be omitted here. However, step S124 in FIG. 5 should read "M=0?" for the second embodiment, where M is the counter value M of the hopping counter 34.

When the base unit 10 is calling a handset in step S104 of FIG. 5 (S104: yes), the process of FIG. 7 for connecting to a handset is executed. In the second embodiment, the process is exactly the same as the process shown in FIG. 7 and described in the first embodiment. Therefore, a description will be omitted here. However, step S176 should read "M=0?" for the second embodiment. Here again, M is the counter value M of the hopping counter 34.

Next, the reception process performed in the handsets is exactly the same as the process described in the first embodiment and shown in FIG. 8. Therefore, the description will be omitted here. However, step 230 of FIG. 8 should read "M=0?" for the second embodiment, where M is the counter value M of the hopping counter 34.

When a calling signal is received from the base unit in step S206 of FIG. 8, the process of connecting to the base unit is executed. This process is exactly the same as the process described in the first embodiment and shown in FIG. 9. Therefore, the description will be omitted here. However, step 254 of FIG. 9 should read "M=0?" for the second embodiment, where M is the counter value M of the hopping counter 34.

Next, when calling another handset as in step S210 or S224 of FIG. 8 (S210: yes or S224: yes), the normal reception/transmission phase order of the handset 12 is reversed, and the following process is executed. The example given for this process is calling the handset 13, but the exact same process is used when calling the handset 11.

Figure 18:
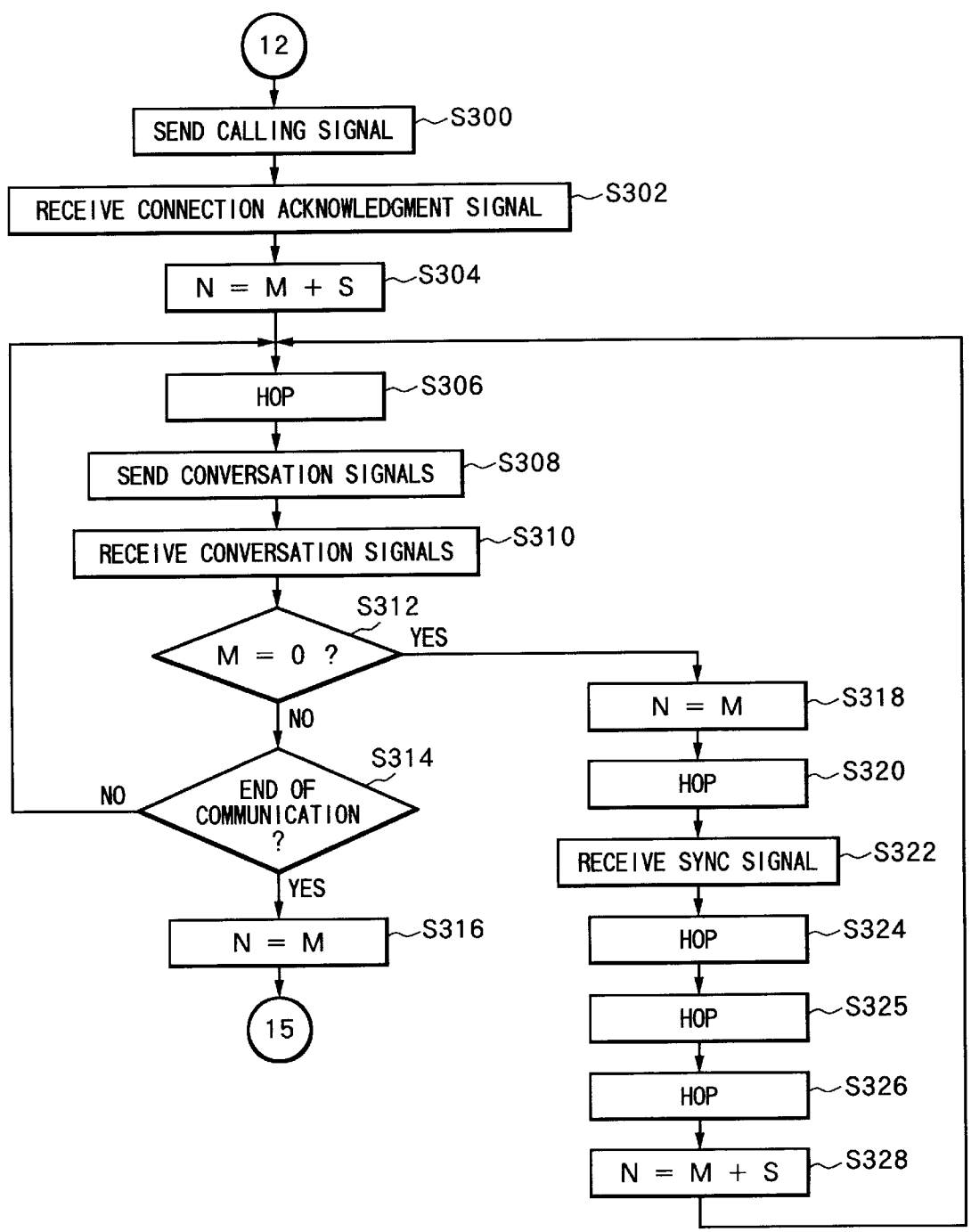
FIG. 18 is a first flowchart showing the transmission and reception processes of the handset of the second embodiment.

As shown in FIG. 18, first a calling signal for calling the handset 13 is transmitted during the transmission phase of the frame (S300), and a connection acknowledgment signal is received from the handset 13 in the subsequent reception phase (S302). After verifying that a connection is possible between the two communicating devices in this way, the prescribed value S is added to the counter value M of the hopping counter 34 and set as the hop number N (S304). Since this example assumes communication with the handset 13, the prescribed value S=4 would be added. For communication with the handset 11, the prescribed value S=2 would be added. Further, assuming communication with the handset 13, conversation between the two communicating devices begins from the following frame, or after skipping the remaining two control frames, in the case of the handset 11.

Next, the counter value M is incremented, and the handset hops to the next frequency (S306). Communication between the two communicating devices begins in this frame, as the handset 12 sends conversation signals during the transmission phase of the frame (S308) and receives conversation signals from the handset 13 during the reception phase of the same frame (S310).

Beginning from this frame, the handsets 12 and 13 both change the frequency for transmission and reception signals using the hop frequency data generated based on the hop number N, which includes the added prescribed value S. By continuing to use this hop frequency data array, the hop frequency data generated will be separated by four phases from the hop frequency data used between the base unit 10 and handset 11 for transmission and reception. In this way, two completely different channels are formed, and the base unit 10 and handset 11 can communicate at the same time as the handsets 12 and 13 without interfering with one another.

If the counter value M has not been reset to zero at this point (S312: no), then the handset checks whether the communication has ended (S314). If the communication has not ended (S314: no), the process returns to step S306 and communication between the handsets continues. If the conversation is over (S314: yes), then the prescribed value S is no longer added to the counter value M, that is, the hop number n is reset to the value of the counter value M (S316), and the process shifts to step S228 of FIG. 8.

If in step S312 the counter value M has been reset (S312: yes), then the hop number N is set to the value of the counter value M (S318), and the handset 12 hops to the next frequency (S320). At this time, the same hop number N is generated for both the base unit 10 and the handsets 11–13, because addition of the prescribed value S to the counter value M has been canceled. Therefore, control signals from the base unit 10 can be received. Accordingly, a synchronization signal is received from the base unit 10 during the reception phase of this frame (S322). Then, the handset 12 hops three times to the subsequent frequencies (S324–326) according to increments of the counter value M until the control frames have been skipped. Then, addition of the prescribed value S to the counter value M is resumed (S328), once again phase-shifting the generated hop frequency data, and the process returns to step S306, where conversation continues between the two handsets.

Next, when a calling signal is received from another handset in step S216 of FIG. 8 (S216: yes), conversation between the two handsets begins. The example given for this process is a call from the handset 13, but the exact same process is used when a call comes from the handset 11.

Figure 19:
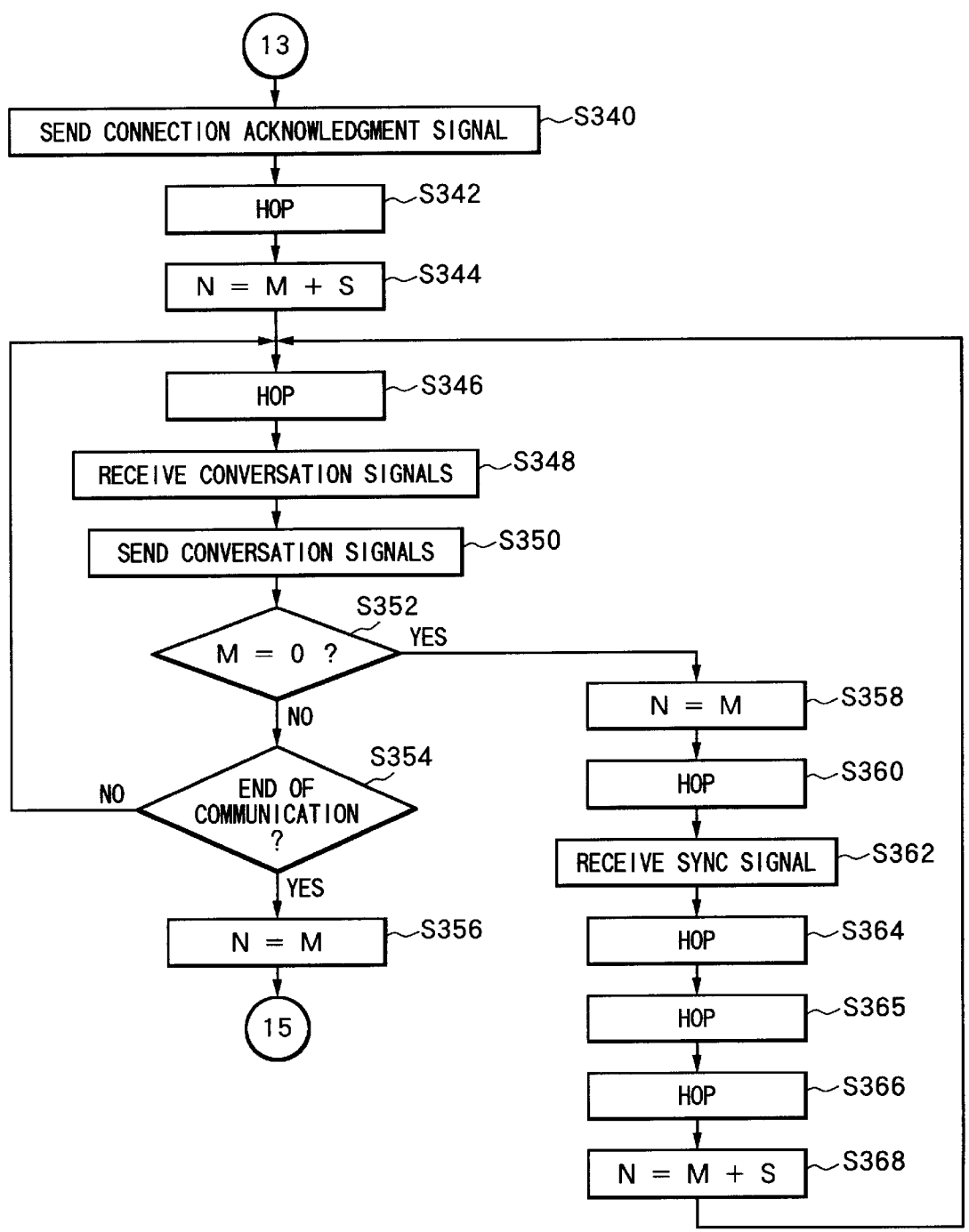
FIG. 19 is a second flowchart showing the transmission and reception processes of the handset of the second embodiment.

As shown in FIG. 19, the handset 12 first sends a connection acknowledgment signal to the handset 13 during the transmission phase of the frame (S340). The counter value M is incremented, and the handset hops to the next frequency (S342). Then, the prescribed value S begins to be added to the counter value M to create the hop number N (S344).

Once again the counter value M is incremented, and the handset hops to the next frequency (S346). Communication between the two communicating devices begins in this frame, as the handset 12 receives conversation signals during the reception phase of the frame (S348) and sends conversation signals to the handset 13 during the transmission phase of the same frame (S350).

Beginning from this frame, the handsets 12 and 13 both change the frequency for transmission and reception signals using the hop frequency data generated based on the hop number N, which includes the added prescribed value S. By continuing to use this hop frequency data array, the hop frequency data generated will be separated by four phases from the hop frequency data used between the base unit 10 and handset 11 for transmission and reception. In this way, two completely different channels are formed, and the base unit 10 and handset 11 can communicate at the same time as the handsets 12 and 13 without interfering with one another.

If the counter value M has not been reset to zero at this point (S352: no), then the handset checks whether the communication has ended (S354). If the communication has not ended (S354: no), the process returns to step S346 and communication between the handsets continues. If the conversation is over (S354: yes), then the prescribed value S is no longer added to the counter value M, that is, the hop number n is reset to the value of the counter value M (S356), and the process shifts to step S228 of FIG. 8.

If in step S352 the counter value M has been reset (S352: yes), then the hop number N is set to the value of the counter value M (S358), and the handset 12 hops to the next frequency (S360). At this time, the same hop number N is generated for both the base unit 10 and the handsets 11–13, because addition of the prescribed value S to the counter value M has been canceled. Therefore, control signals from the base unit 10 can be received. Accordingly, a synchronization signal is received from the base unit 10 during the reception phase of this frame (S362). Then, the handset 12 hops three times to the subsequent frequencies (S364–366) according to increments of the counter value M until the control frames have been skipped. Then, addition of the prescribed value S to the counter value M is resumed (S368), once again phase-shifting the generated hop frequency data, and the process returns to step S346, where conversation continues between the two handsets.

In the second embodiment described above, the phase shift applied to frequencies used for communication between two handsets is canceled for four frames, when the counter value M is between 0 and 3, allowing control signals to be transmitted and received between the base unit 10 and the handsets 11–13. However, a hop frequency data array C for control use could be generated in the hop frequency data generator 21 by phase-shifting the hop frequency data array B used for communication between the base unit and handsets to create a hop frequency data array different from H1 and H2 used for communication between two handsets. Therefore, when the hop frequency data generator 21 generated the hop frequency data array C for control use, the communicating units 22 could transmit and receive control signals between the base unit and all the handsets. When performing communications between specified communicating devices, the hop frequency data arrays B, H1, or H2 could be used. Communicating devices in a wait state could constantly use the hop frequency data array C to perform synchronization and calling operations. After a link is made with another communicating device, the hop frequency data array could be switched to one of the data arrays B, H1, or H2.

The phase shift can be temporarily canceled for all of the hop frequency data arrays C, B, H1, and H2 in order to generate control frames for synchronization adjustments and the like. However, this configuration is not absolutely necessary because synchronization will not necessarily be lost if such synchronization adjustments are not made. If the temporary cancellation of phase shifts is not used, synchronization adjustments and the like can be performed once communication ends between two handsets and the handsets resume communication with the base unit.

Next, a wireless communication system according to a third embodiment of the present invention will be described while referring to the accompanying drawings wherein like parts and components are designated by the same reference numerals to avoid duplicating description. The wireless communication system of the third embodiment is exactly the same as the system described in the second embodiment, except for the variations described below. The flowcharts and diagrams used for describing the second embodiment are equally applicable to the third embodiment. However, the counter value M as appeared in the description of the second embodiment needs to be replaced with a hop number N when the description in the second embodiment is referred to to understand the third embodiment.

Figure 20:
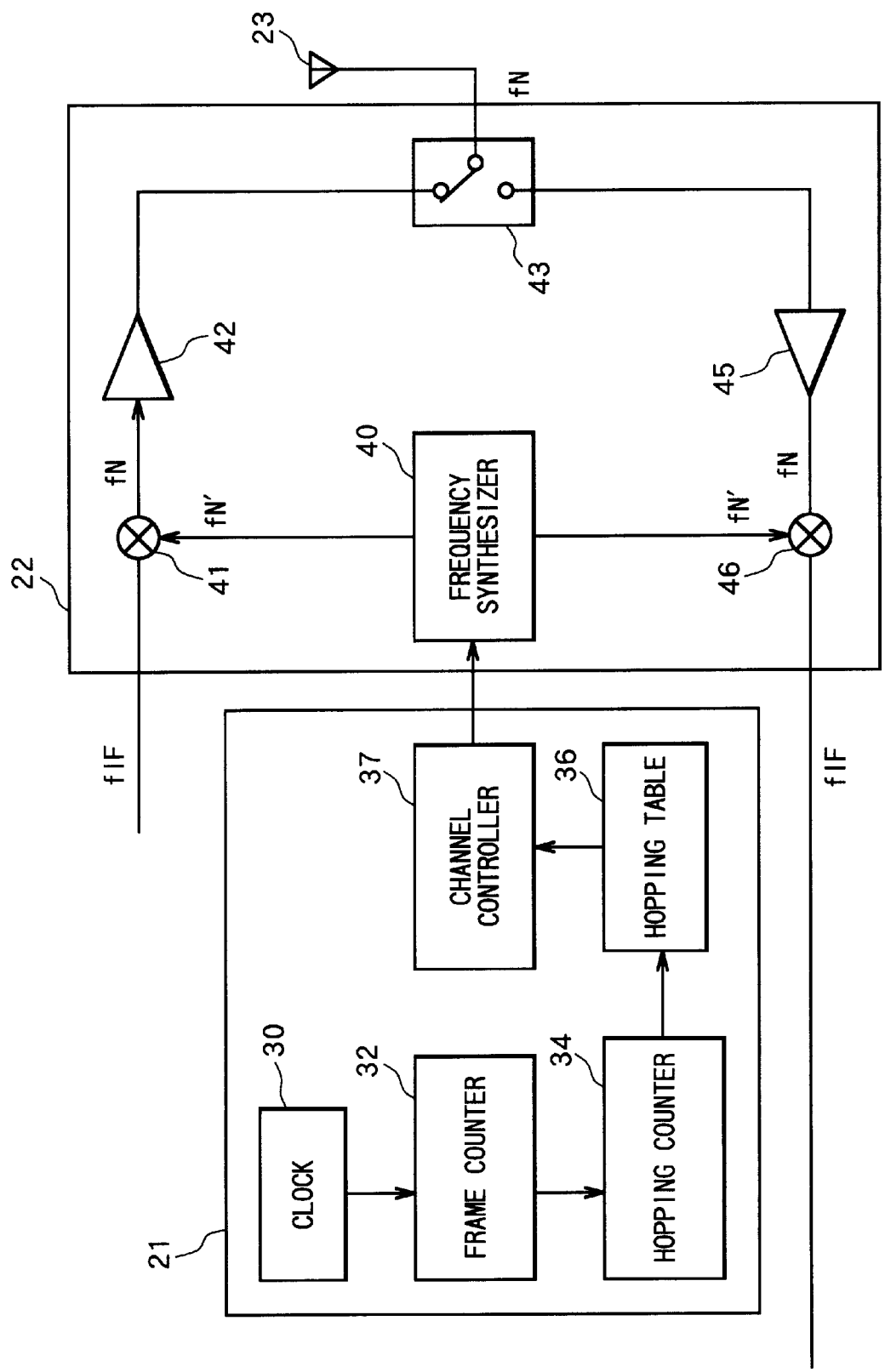
FIG. 20 is a block diagram showing the circuit configuration in the necessary portions of the base unit and handsets of the third embodiment.

As shown in FIG. 20, the base unit 10 and the handsets 11–13 have the same configuration as described in the second embodiment. However, the hop frequency data generator 21 of the third embodiment does not include a hopping controller 35. The hop frequency data generator 21 of the third embodiment, however, also includes a channel controller 37. This channel controller 37 reads hop frequency data from the hopping table 36 based on output from the hopping counter 34, adds a prescribed correcting value to the data read, and outputs the corrected hop frequency data. The hop frequency data generator 21 then generates the corrected hop frequency data in the form of output signals. The frame counter 32, hopping counter 34, hopping table 36, and channel controller 37 can be configured as separate units or can be replaced with a logic computation process performed by a CPU, which is well-known in the art.

Therefore, the channel controller 37 reads hop frequency data $d_i$, described in the second embodiment, from the hopping table 36, and converts the data $d_i$ to hop frequency data $e_i$, which is output as output signals from the hop frequency data generator 21.

For communication between two handsets, the channel controller 37 outputs the hop frequency data $d_1$ with no changes as the hop frequency data $e_1$ only when the hop number N is between 0 and 3. When the hop number N is between 4 and n, the channel controller 37 adds a prescribed value p to the hop frequency data $d_1$ read from the hopping table 36 and outputs the result as the hop frequency data $e_1$.

In the present system, the prescribed value p is either 1 or 2. More specifically, the handsets 11–13 are provided with ID numbers #1–#3, respectively. When two of the handsets communicate with each other, the prescribed value p equivalent to the value of the lowest ID among the two handsets is selected.

Another possibility is to select the prescribed value p according to the ID number of the calling handset. Further, it is possible to prearrange p values for only the number of possible combinations, that is, half of the total number of handsets (truncated to an integer if the total number is odd).

Table 2 below shows the relationship between the hop frequency data $d_1$ and the hop frequency data $e_1$ when the prescribed values p are 1 and 2, using the correction method described above.

TABLE 2

| N | 0 | 1 | 2 | 3 | 4 | ... | n |
|---|---|---|---|---|---|-----|---|
| $d_i$ | $d_0$ | $d_1$ | $d_2$ | $d_3$ | $d_4$ | ... | $d_n$ |
| $e_i$ (p = 1) | $d_0$ | $d_1$ | $d_2$ | $d_3$ | $d_4 + 1$ | ... | $d_n + 1$ |
| $e_i$ (p = 2) | $d_0$ | $d_1$ | $d_2$ | $d_3$ | $d_4 + 2$ | ... | $d_n + 2$ |

In short, when the hop number N is between 4 and n, the hop frequency data $d_1$ is corrected by addition of the prescribed value p for either communication between the base unit and handset or communication between two handsets. When the hop number N is between 0 and 3, correction using the prescribed value p is temporarily canceled, and the same hop frequency data $d_1$ is used for communication between both pairs.

When calling another handset as in step S210 or S224 of FIG. 8 (S210: yes or S224: yes), the normal reception/transmission phase order of the handset 12 is reversed, and the following process is executed. The example given for this process is calling the handset 13, but the exact same process is used when calling the handset 11.

Figure 21:
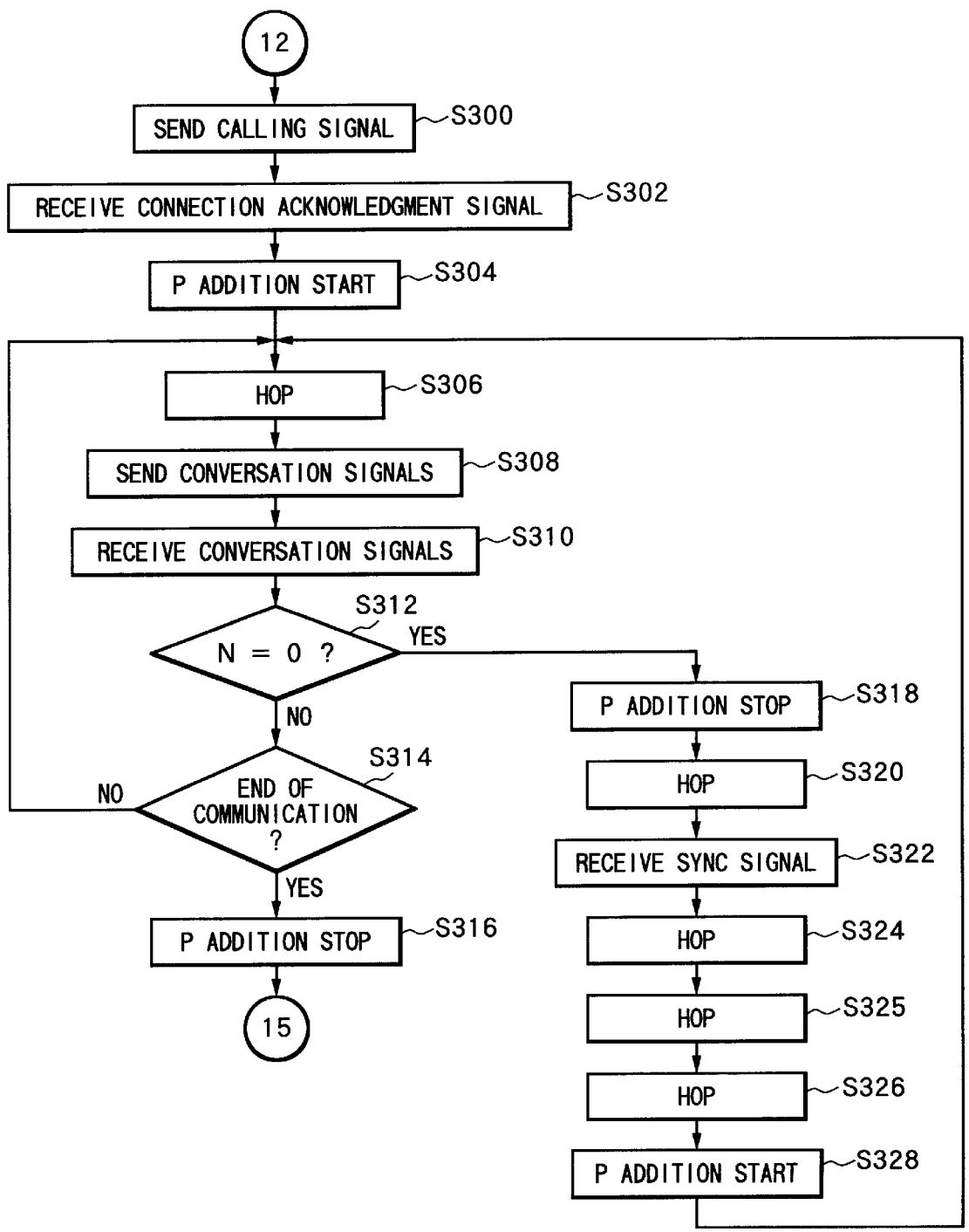
FIG. 21 is a first flowchart showing the transmission and reception processes of the handset of the third embodiment.

As shown in FIG. 21, first a calling signal for calling the handset 13 is transmitted during the transmission phase of the frame (S300), and a connection acknowledgment signal is received from the handset 13 in the subsequent reception phase (S302). After verifying that a connection is possible between the two communicating devices in this way, the prescribed value p begins to be added to hop frequency data by the channel controller 37 (S304). Since this example assumes communication with the handset 13, the prescribed value p=2 would be added. For communication with the handset 11, the prescribed value p=1 would be added. Further, assuming communication with the handset 13, conversation between the two communicating devices begins from the following frame, or after skipping the remaining two control frames, in the case of the handset 11.

Next, the hop number N is incremented, and the handset hops to the next frequency (S306). Communication between the two communicating devices begins in this frame, as the handset 12 sends conversation signals during the transmission phase of the frame (S308) and receives conversation signals from the handset 13 during the reception phase of the same frame (S310).

Beginning from this frame, the handsets 12 and 13 both change the frequency for transmission and reception signals using the hop frequency data added with the prescribed value p. By continuing to use this hop frequency data array, the hop frequency data generated will be shifted Δf from the hop frequency data used between the base unit 10 and handset 11 for transmission and reception. In this way, two completely different channels are formed, and the base unit 10 and handset 11 can communicate at the same time as the handsets 12 and 13 without interfering with one another.

If the hop number N has not been reset to zero at this point (S312: no), then the handset checks whether the communication has ended (S314). If the communication has not ended (S314: no), the process returns to step S306 and communication between the handsets continues. If the conversation is over (S314: yes), then the prescribed value p is no longer added by the channel controller 37 to the hop frequency data (S316), and the process shifts to step S228 of FIG. 8.

If in step S312 the hop number N has been reset (S312: yes), then addition of the prescribed value p to the hop frequency data is canceled (S318), and the handset 12 hops to the next frequency (S320). At this time, the same hop frequency data is generated for both the base unit 10 and the handsets 11–13, because addition of the prescribed value p to the data has been canceled. Therefore, control signals from the base unit 10 can be received. Accordingly, a synchronization signal is received from the base unit 10 during the reception phase of this frame (S322). Then, the handset 12 hops three times to the subsequent frequencies (S324–326) according to increments of the hop number N until the control frames have been skipped. Then, addition of the prescribed value p to the hop frequency data is resumed (S328), and the process returns to step S306, where conversation continues between the two handsets.

Next, when a calling signal is received from another handset in step S216 of FIG. 8 (S216: yes), conversation between the two handsets begins. The example given for this process is a call from the handset 13, but the exact same process is used when a call comes from the handset 11.

Figure 22:
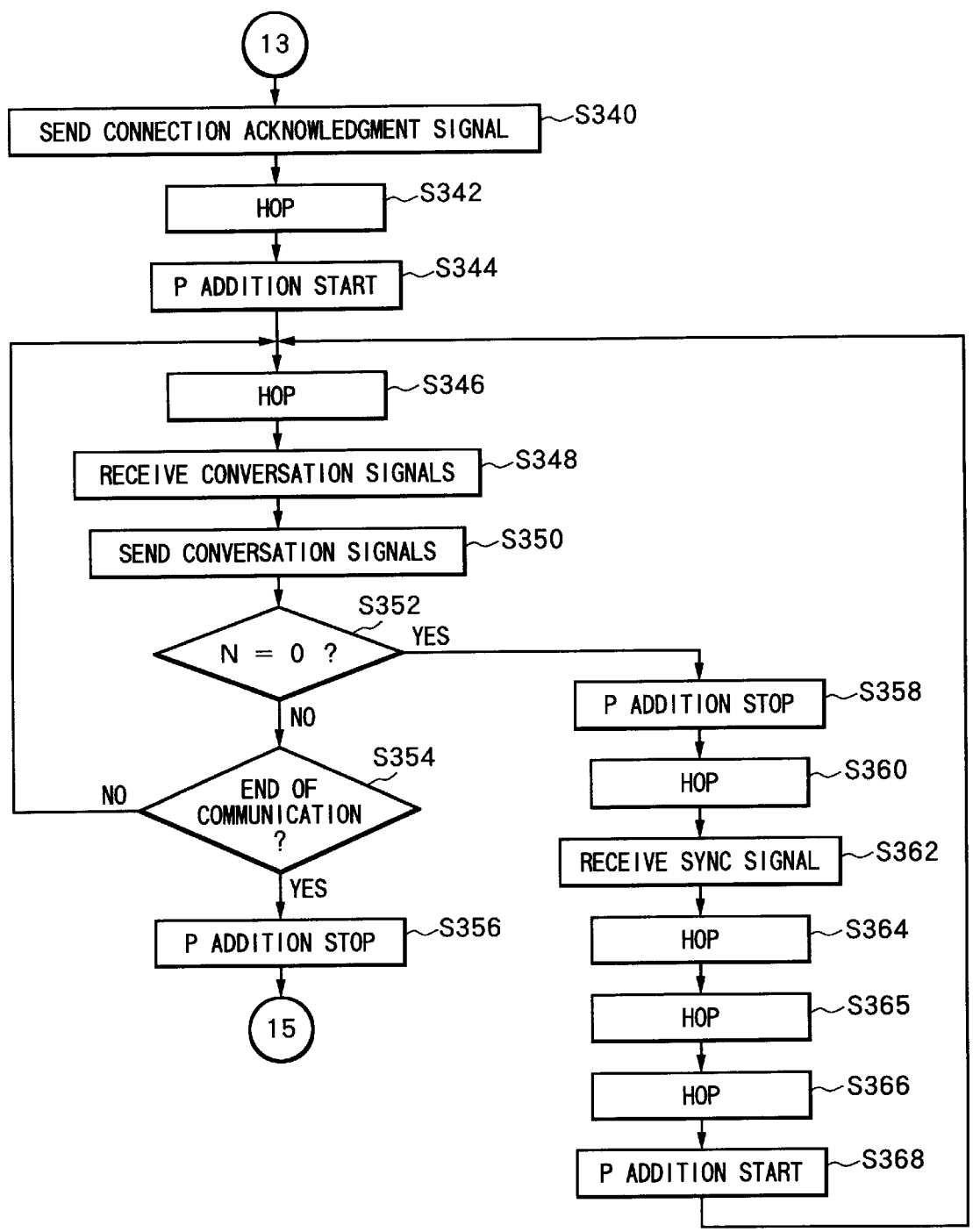
FIG. 22 is a second flowchart showing the transmission and reception processes of the handset of the third embodiment.

As shown in FIG. 22, the handset 12 first sends a connection acknowledgment signal to the handset 13 during the transmission phase of the frame (S340). The hop number N is incremented, and the handset hops to the next frequency (S342). Then, the prescribed value p begins to be added to the hop frequency data by the channel controller 37 (S344).

Once again the hop number N is incremented, and the handset hops to the next frequency (S346). Communication between the two communicating devices begins in this frame, as the handset 12 receives conversation signals during the reception phase of the frame (S348) and sends conversation signals to the handset 13 during the transmission phase of the same frame (S350).

Beginning from this frame, the handsets 12 and 13 both change the frequency for transmission and reception signals using the hop frequency data added with the prescribed value p. By continuing to use this hop frequency data array, the hop frequency data generated will be shifted Δf from the hop frequency data used between the base unit 10 and handset 11 for transmission and reception. In this way, two completely different channels are formed, and the base unit 10 and handset 11 can communicate at the same time as the handsets 12 and 13 without interfering with one another.

If the hop number N has not been reset to zero at this point (S352: no), then the handset checks whether the communication has ended (S354). If the communication has not ended (S354: no), the process returns to step S346 and communication between the handsets continues. If the conversation is over (S354: yes), then the prescribed value p is no longer added to the hop frequency data (S356), and the process shifts to step S228 of FIG. 8.

If in step S352 the hop number N has been reset (S352: yes), then addition of the prescribed value p to the hop frequency data is canceled (S358), and the handset 12 hops to the next frequency (S360). At this time, the same hop frequency data is generated for both the base unit 10 and the handsets 11–13, because addition of the prescribed value p to the data has been canceled. Therefore, control signals from the base unit 10 can be received. Accordingly, a synchronization signal is received from the base unit 10 during the reception phase of this frame (S362). Then, the handset 12 hops three times to the subsequent frequencies (S364–366) according to increments of the hop number N until the control frames have been skipped. Then, addition of the prescribed value p to the hop frequency data is resumed (S368), and the process returns to step S346, where conversation continues between the two handsets.

What is claimed is:

1. In a wireless communication system including a main communicating device that can be connected to an external communication path and a plurality of sub communicating devices, including a first and second sub communicating device and a selected sub communicating device, that can communicate wirelessly with the main communicating device, wherein a frequency hopping method is used to perform communications between the main communicating device and the selected sub communicating device of the plurality of sub communicating devices by sequentially changing the frequency used by the main communicating device according to a prescribed hoping pattern and by sequentially changing the frequency used by the selected sub communicating device in synchronism with the frequency used by the main communicating device, a wireless communication method comprising the steps of:

a) sequentially changing a frequency used by the first sub communicating device of the plurality of sub communicating devices according to another hopping pattern different from the prescribed hopping pattern and sequentially changing a frequency used by the second sub communicating device of the plurality of sub communicating devices in synchronism with the frequency used by the first sub communicating device, thereby performing direct communication between the first sub communicating device and the second sub communicating device, wherein a portion of the prescribed hopping pattern has a pattern identical to a portion of the another hopping pattern; and b) when the frequency used by the main communicating device and the frequency used by the first sub communicating device are changed according to the portion having the identical pattern, performing communication between the main communicating device and each one of a non-selected first sub communicating device and a non-selected second sub communicating device, wherein performing transmission and reception of control signals between the main communicating device and each one of the non-selected first sub communicating device and the non-selected second sub communicating device when the hopping patterns used by the main communicating device and each one of the non-selected first sub communicating device and the non-selected second sub communicating device agree with each other.

2. The wireless communication method of claim 1, wherein in the step b) control signals are transmitted and received in the communication, the control signals including at least one of the synchronization signals for recovering synchronicity, calling signals for calling the plurality of sub communicating devices, connection acknowledgment signals for indicating a call from the plurality of sub communicating device was received, and busy signals for indicating the main communicating device is currently performing communication operations.

3. A wireless communication system that communicates by a frequency hopping method, comprising:

a main communicating device that can be connected to an external communications path;

a plurality of sub communicating devices, including a first and a second sub communicating device and a selected sub communicating device, that can communicate wirelessly with the main communicating device;

a hop frequency data generator provided in each of said main communicating device and said plurality of sub communicating devices, said hop frequency data generator sequentially generating prescribed hop frequency data; and a communicating unit provided in each of said main communicating device and said plurality of sub communicating devices, each of said communicating units using the prescribed hop frequency data supplied by the corresponding hop frequency data generator to create transmission signals by frequency spreading input signals and to create output signals by frequency despreading reception signals, wherein said hop frequency data generator provided in each of said plurality of sub communicating devices generates hop frequency data arrays for communication between two sub communicating devices of the plurality of sub communicating devices, which data arrays are different from the hop frequency data arrays for communication between the main communicating device and a selected sub communicating device, and wherein communicating units in the first and second sub communicating devices perform direct communications therebetween using the hop frequency data arrays for communicating between the two sub communicating devices, wherein transmission signals are created by frequency spreading input signals and output signals are created by frequency despreading reception signals, wherein a portion of the hop frequency data arrays used for communicating between the first and second sub communicating devices has a pattern that is identical to a portion of the hop frequency data arrays used for communication between the main communicating device and the selected sub communicating device, and wherein the communicating unit of the main communicating device performs transmission and reception of control signals between said main communicating device and said plurality of sub communicating devices when the hop frequency data generator of the main communicating device generates hop frequency data in the identical portion of the data arrays, wherein an ordinary communication is not performed with the same frequency of the same pattern or with the frequency of a second hopping pattern.

4. The wireless communication system as claimed in claim 3, wherein the control signals include synchronization signals for recovering synchronicity, and wherein said communicating unit in each of said plurality of sub communicating devices waits in a state in which said communicating unit receives the control signals from said main communicating device when said hop frequency data generator in said sub communicating device generates the hop frequency data in the identical portion of the data arrays.

5. The wireless communication system as claimed in claim 3, wherein said hop frequency data generator comprises:

data memory that stores prescribed hop frequency data arrays; and hop frequency data changing means for updating data within a hop frequency data array stored in said data memory.

6. The wireless communication system as claimed in claim 5, further comprising an interference detector that detects interference during communications, and wherein the hop frequency data changing means excludes from a data array hop frequency data used when interference is detected by said interference detector.

7. The wireless communication system as claimed in claim 3, wherein said hop frequency data generator in said plurality of sub communicating devices are capable of generating a plurality of different hop frequency data arrays for use in communication between two selected sub communicating devices, and wherein said communicating units in said plurality of sub communicating devices form a plurality of channels that allow simultaneous communication between a plurality of pairs of sub communicating devices by performing transmission and reception using one of the plurality of hop frequency data arrays for each pair of sub communicating devices.

8. The wireless communication system as claimed in claim 3, wherein at least two external communication paths are connected to said main communicating device, and one of the external communication paths is connected to a sub communicating device via said communicating unit.

9. The wireless communication system of claim 3, wherein the control signals include at least one of synchronization signals for recovering synchronicity, calling signals for calling the plurality of sub communicating devices, connection acknowledgment signals for indicating a call from the plurality of sub communicating devices was received, and busy signals for indicating the main communicating device is currently performing communication operations.

10. A wireless communication system that communicates by a frequency hopping method, comprising:
   a main communicating device that can be connected to an external communications path;
   a plurality of sub communicating devices that can communicate wirelessly with the main communicating device;
   a hop frequency data generator provided in said main communicating device and each of said plurality of sub communicating devices, said hop frequency data generator sequentially generating prescribed hop frequency data for both the main communicating device and said plurality of sub communicating devices; and
   a communicating unit provided in said main communicating device and each of said plurality of sub communicating devices, said communicating unit using hop frequency data supplied from said hop frequency data generator to create transmission signals by frequency spreading input signals and to create output signals by frequency despreading reception signals,
   wherein said hop frequency data generator in each of said plurality of sub communicating devices generates hop frequency data arrays for communication between two selected sub communicating devices by phase-shifting the hop frequency data arrays used for communication between said main communicating device and a selected sub communicating device, and wherein said communicating units in said plurality of sub communicating devices perform direct communications between the two selected sub communicating devices by using the hop frequency data for communication between two selected sub communicating devices to create transmission signals by frequency spreading the input signals and to create output signals by frequency despreading the reception signals.

11. The wireless communication system as claimed in claim 10, wherein said hop frequency data generator in said plurality of sub communicating devices can temporarily cancel the phase shifting when generating hop frequency data arrays for communication between two selected sub communicating devices, and said communicating unit transmits and receives control signals between said main communicating device and said plurality of sub communicating devices while the phase shifting is canceled.

12. The wireless communication system as claimed in claim 10, wherein said hop frequency data generator generates hop frequency data arrays for control use by phase-shifting the hop frequency data array used for communication between said main communicating device and the selected sub communicating device to a different hop frequency data array from that created for communication between two selected sub communicating devices, and wherein said communicating unit performs transmission and reception of control signals between said main communicating device and said plurality of sub communicating devices when said hop frequency data generator generates the hop frequency data array for control use.

13. The wireless communication system as claimed in claim 11, wherein, when two selected sub communicating devices are engaged in communication, adjustments to synchronize the sub communicating devices to said main communicating device are performed at regular intervals by transmission and reception of control signals between said main communicating device and said plurality of sub communicating devices.

14. The wireless communication system as claimed in claim 11, wherein adjustments to synchronize said plurality of sub communicating devices to said main communicating device are performed by transmission and reception of control signals between said main communicating device and said plurality of sub communicating devices after communication between two selected sub communicating devices has ended.

15. The wireless communication system as claimed in claim 10, wherein said hop frequency data generator in each of said plurality of sub communicating devices is capable of generating hop frequency data for recovering synchronization, and wherein said communicating unit in each of said plurality of sub communicating devices waits in a state receives control signals from said main communicating device when said hop frequency data generator in said plurality of sub communicating devices generates hop frequency data for recovering synchronization.

16. The wireless communication system as claimed in claim 10, wherein said hop frequency data generator in each of said plurality of sub communicating devices generates more than two hop frequency data arrays by way of phase-shifting, said two hop frequency data arrays being used in communication between two selected sub communicating devices, and wherein said communicating units in said plurality of sub communicating devices form a plurality of channels that allow simultaneous communication between a plurality of pairs of sub communicating devices by performing transmission and reception using one of the plurality of hop frequency data arrays for each pair of sub communicating devices.

17. The wireless communication system as claimed in claim 10, wherein said hop frequency data generator comprises:
   data memory that stores prescribed hop frequency data arrays;
   index value storing means for holding an index value used to perform sequential updates synchronous to another communicating device; and
   index value correcting means for correcting the index value stored in said index value storing means a prescribed amount to create a corrected index value,
   wherein the prescribed hop frequency data arrays stored in said data memory are referred to using the corrected index value as a parameter, and hop frequency data arrays are generated by phase-shifting the prescribed hop frequency data arrays according to the corrected index value.

18. The wireless communication system as claimed in claim 17, wherein said index value correcting means retains the index value stored in said index value storing means as the modified index value when said hop frequency data generator generates a hop frequency data array either for communication between said main communicating device and the selected sub communicating device or for control use, and said index value correcting means calculates a modified index value by adding a specified value to the index value stored in said index value storing means when said hop frequency data generator generates another hop frequency data array.

19. The wireless communication system as claimed in claim 10, wherein a phase of a phase-shifted hop frequency data array generated by the hop frequency data generator in one of two selected sub communicating devices is shifted forward or backward by at least two phases from a phase of a hop frequency data array generated by the hop frequency data generator in another sub communicating device communicating with the main communicating device at the same time.

20. A wireless communication system that communicates by a frequency hopping method, comprising;

a main communicating device that can be connected to an external communications path;

a plurality of sub communicating devices that can communicate wirelessly with said main communicating device;

a hop frequency data generator that sequentially generates prescribed hop frequency data for both said main communicating device and said plurality of sub communicating devices; and a communicating unit that uses the hop frequency data supplied from said hop frequency data generator to create transmission signals by frequency spreading input signals and to create output signals by frequency despreading reception signals, wherein said hop frequency data generator in each of said plurality of sub communicating devices generates hop frequency data arrays for communication between two selected sub communicating devices by increasing or decreasing a prescribed amount each of the data in the hop frequency data arrays used for communication between said main communicating device and a selected sub communicating device, and wherein said communicating units in said plurality of sub communicating devices perform direct communications between two selected sub communicating devices by using the hop frequency data for communication between two selected sub communicating devices to create transmission signals by frequency spreading input signals and to create output signals by frequency despreading reception signals.

21. The wireless communication system as claimed in claim 20, wherein said hop frequency data generator in each of said plurality of sub communicating devices can temporarily cancel prescribed increases or decreases to the hop frequency data when generating hop frequency data arrays for communication between two selected sub communicating devices, and said communicating unit transmits and receives control signals between said main communicating device and said plurality of sub communicating devices while the increase or decrease adjustment is canceled.

22. The wireless communication system as claimed in claim 20, wherein said hop frequency data generator is capable of generating hop frequency data arrays for control use by increasing or decreasing each data in the hop frequency data array used for communication between the main communicating device and a sub communicating device to create a different hop frequency data array from that created for communication between two sub communicating devices, and wherein said communicating unit performs transmission and reception of control signals between said main communicating device and said plurality of sub communicating devices when said hop frequency data generator generates the hop frequency data array for control use.

23. The wireless communication system as claimed in claim 21, wherein when two selected sub communicating devices are engaged in communication, adjustments to synchronize the sub communicating devices to the main communicating device are performed at regular intervals by the transmission and reception of control signals between said main communicating device and said plurality of sub communicating devices.

24. The wireless communication system as claimed in claim 21, wherein adjustments to synchronize said sub communicating devices to said main communicating device are performed by the transmission and reception of control signals between the main communicating device and sub communicating devices after communication between two sub communicating devices has ended.

25. The wireless communication system as claimed in claim 20, wherein the hop frequency data generating means in the sub communicating devices generates hop frequency data for recovering synchronization, and wherein said communicating unit in each of said sub communicating devices waits in a state receive control signals from said main communicating device when said hop frequency data generator in said sub communicating devices generates hop frequency data for recovering synchronization.

26. The wireless communication system as claimed in claim 20, wherein the hop frequency data generators in said sub communicating devices generates a plurality of different hop frequency data arrays, increased or decreased by specified values so that each data array is different from the others, for use in communication between two sub communicating devices, and wherein said communicating units in said sub communicating devices form a plurality of channels that allow simultaneous communication between a plurality of pairs of sub communicating devices by performing transmission and reception using one of the plurality of hop frequency data arrays for each pair of sub communicating devices.

27. The wireless communication system as claimed in claim 20, wherein said hop frequency data generator comprises:

data memory that stores prescribed hop frequency data arrays;

index value storing means for holding an index value used to perform sequential updates synchronous to another communicating device; and data modifying means that use the index value stored by the index value storing means as a parameter for referencing data stored by the data memory and adding a prescribed value to the data, wherein said data modifying means is used to generate hop frequency data arrays whose data is increased or decreased by specified values.

28. The wireless communication system as claimed in claim 27, wherein said data modifying means retains the data stored by the data memory as modified data when the hop frequency data generating means generates a hop frequency data array either for communication between said main communicating device and said sub communicating device or for control use, and wherein said data modifying means calculates modified data by adding a specified value to the data stored by the data memory when said hop frequency data generator generates another hop frequency data array.

29. The wireless communication system as claimed in claim 20, wherein the prescribed amounts by which data within hop frequency data arrays are increased or decreased are smaller than the difference between neighboring hop frequency data within the hop frequency data arrays.

30. In a wireless communication system including a main communicating device that can be connected to an external communication path and a plurality of sub communicating devices, including a first and a second sub communicating device and a selected communicating device, that can communicate wirelessly with the main communicating device, wherein a frequency hopping method is used to perform communications between the main communicating device and a selected sub communicating device by sequentially changing the frequency used by the main communicating device according to a prescribed hopping pattern and by sequentially changing the frequency used by the selected sub communicating device in synchronism with the frequency used by the main communicating device, a wireless communication method comprising the steps of:

a) sequentially changing a frequency used by the first sub communicating device according to a first hopping pattern different from the prescribed hopping pattern and sequentially changing a frequency used by the second sub communicating device in synchronism with the frequency used by the first sub communicating device, thereby performing direct communication between the first sub communicating device and the second sub communicating device, and b) sequentially changing the frequency used by the main communicating device and the frequency used by at least one of the selected sub communicating device, the first sub communicating device, and the second sub communicating device according to a second hopping pattern different from both the prescribed hopping pattern and the first hopping pattern, thereby performing communication between the main communicating device and the at least one of a non-selected first sub communicating device and a non-selected second sub communicating device, wherein the frequency hopping based on the second hopping pattern is used for transmission and reception of the control signals, but not for the ordinary communication.

31. A wireless communication system that communicates by a frequency hopping method, comprising:

a main communicating device that can be connected to an external communications path;

a plurality of sub communicating devices, including a first and a second sub communicating device and a selected sub communicating device, that can communicate wirelessly with the main communicating device;

a hop frequency data generator provided in each of said main communicating device and each of said plurality of sub communicating devices, said hop frequency data generator sequentially generating prescribed hop frequency data; and a communicating unit provided in each of said main communicating device and each of said plurality of sub communicating devices, said communicating unit using the prescribed hop frequency data supplied from said hop frequency data generator in said sub communicating device to create transmission signals by frequency spreading input signals and to create output signals by frequency despreading reception signals, wherein said hop frequency data generator provided in each of said plurality of sub communicating devices generates hop frequency data arrays for communication between two sub communicating devices, which data arrays are different from the hop frequency data arrays for communicating between the main communicating device and the selected sub communicating device, and wherein communicating units in the first and second sub communicating devices of said plurality of sub communicating devices perform direct communication therebetween using the hop frequency data arrays for communicating between two sub communicating devices, wherein transmission signals are created by frequency spreading input signals and output signals are created by frequency despreading reception signals, and each of said hop frequency data generators of said main communicating device and each of said sub communicating devices further generates a hop frequency data array for control use that is different from the hop frequency data arrays for communicating both between the main communicating device and the selected sub communicating device and between the first and second sub communicating devices, and wherein when said hop frequency data generator of the main communicating device and said hop frequency data generator of at least one of the plurality of sub communicating devices generate data from the hop frequency data array for control use, said communicating unit of said main communicating device performs transmission and reception of control signals between said main communicating device and at least one of the plurality of sub communicating devices, wherein an ordinary communication is not performed with the same frequency of the same pattern or with the frequency of a second hopping pattern.

* * * * *